(12) United States Patent
Giaier et al.

(10) Patent No.: US 12,005,749 B2
(45) Date of Patent: Jun. 11, 2024

(54) METHODS AND APPARATUS FOR PAYLOAD ESTIMATION AND HITCH CONDITION DETECTION USING INTEGRATED SENSORS

(71) Applicant: Ford Global Technologies, LLC, Dearborn, MI (US)

(72) Inventors: Kevin Stanton Giaier, Sylvan Lake, MI (US); Andrew Niedert, Dearborn, MI (US); Elliott Pearson, Shelby Township, MI (US); Anton Rogness, Dearborn, MI (US)

(73) Assignee: Ford Global Technologies, Dearborn, MI (US)

( * ) Notice: Subject to any disclaimer, the term of this patent is extended or adjusted under 35 U.S.C. 154(b) by 0 days.

(21) Appl. No.: 18/084,391

(22) Filed: Dec. 19, 2022

(65) Prior Publication Data

US 2023/0123744 A1    Apr. 20, 2023

Related U.S. Application Data

(62) Division of application No. 16/435,108, filed on Jun. 7, 2019, now Pat. No. 11,560,028.

(51) Int. Cl.
*B60D 1/58* (2006.01)
*B60D 1/06* (2006.01)
(Continued)

(52) U.S. Cl.
CPC ............ *B60D 1/58* (2013.01); *B60D 1/06* (2013.01); *G01G 19/12* (2013.01); *G01L 5/00* (2013.01);
(Continued)

(58) Field of Classification Search
CPC . B60D 1/58; B60D 1/06; B60D 1/248; B60D 1/62; B60D 1/24; G01G 19/12;
(Continued)

(56) References Cited

U.S. PATENT DOCUMENTS

| | | |
|---|---|---|
| 9,885,575 B2 | 2/2018 | Collin |
| 9,956,965 B1 | 5/2018 | Hall et al. |

(Continued)

FOREIGN PATENT DOCUMENTS

| | | |
|---|---|---|
| DE | 10 2018 128 578 A1 | 5/2019 |
| EP | 2 905 155 A1 | 7/2011 |

(Continued)

OTHER PUBLICATIONS

Translation EP-2727752 (Year: 2014).*
(Continued)

*Primary Examiner* — Peter J Macchiarolo
*Assistant Examiner* — Monica S Young
(74) *Attorney, Agent, or Firm* — Hanley, Flight & Zimmerman, LLC; Lorne Forsythe

(57) ABSTRACT

Methods, apparatus, systems and articles of manufacture are disclosed for payload estimation and fault detection using hitch integrated sensors. An example apparatus includes a pin orientation determiner to determine a first orientation of a first pin and a second orientation of a second pin, the first pin and the second pin disposed within a hitch and calculate a relative orientation of the first pin and the second pin based on the first orientation and the second orientation. The example apparatus further includes a hitch condition detector to determine if a physical change has occurred in the hitch by comparing the relative orientation to an installation orientation of the first pin and the second pin.

20 Claims, 11 Drawing Sheets

(51) Int. Cl.
  *B60D 1/24* (2006.01)
  *B60D 1/62* (2006.01)
  *G01C 9/00* (2006.01)
  *G01G 19/12* (2006.01)
  *G01L 1/12* (2006.01)
  *G01L 5/00* (2006.01)
  *G01L 5/13* (2006.01)

(52) U.S. Cl.
  CPC .............. *B60D 1/24* (2013.01); *B60D 1/248* (2013.01); *B60D 1/62* (2013.01); *G01C 9/00* (2013.01); *G01L 1/12* (2013.01); *G01L 5/0028* (2013.01); *G01L 5/136* (2013.01)

(58) Field of Classification Search
  CPC . G01L 5/00; G01L 1/12; G01L 5/0028; G01L 5/136; G01C 9/00
  USPC ...................................................... 73/117.01
  See application file for complete search history.

(56) References Cited

U.S. PATENT DOCUMENTS

| | | | |
|---|---|---|---|
| 10,094,704 | B2 | 10/2018 | Tejeda et al. |
| 2012/0024081 | A1* | 2/2012 | Baker ..................... G01L 5/136 280/511 |
| 2012/0326894 | A1* | 12/2012 | Schmidt .................. B64F 1/224 340/960 |
| 2013/0253814 | A1* | 9/2013 | Wirthlin ................. G01G 19/02 701/1 |
| 2015/0204738 | A1 | 7/2015 | Kempainen et al. |
| 2017/0305436 | A1 | 10/2017 | Maskell et al. |
| 2018/0072118 | A1* | 3/2018 | Dudar ..................... B60D 1/62 |
| 2019/0143769 | A1 | 5/2019 | Niedert et al. |
| 2019/0263204 | A1* | 8/2019 | Reed ....................... G01G 19/12 |
| 2019/0344631 | A1 | 11/2019 | Gießibl |
| 2020/0041362 | A1* | 2/2020 | Reed ....................... B60D 1/248 |
| 2020/0102009 | A1* | 4/2020 | Owen .................. B62D 15/028 |
| 2020/0198421 | A1* | 6/2020 | Reed ......................... B60D 1/62 |
| 2020/0198423 | A1* | 6/2020 | Reed ..................... G01L 5/0033 |
| 2021/0039457 | A1 | 2/2021 | Niedert et al. |
| 2021/0318189 | A1 | 10/2021 | Giaier et al. |

FOREIGN PATENT DOCUMENTS

| | | | | |
|---|---|---|---|---|
| EP | 2727752 | A1 * | 5/2014 | ............. B60D 1/248 |
| EP | 2801488 | A1 * | 11/2014 | ............. B60D 1/248 |
| EP | 2 949 490 | B1 | 5/2015 | |
| EP | 3 379 222 | A1 | 9/2018 | |
| GB | 2530995 | A * | 4/2016 | ............... B60D 1/30 |
| NL | 1024538 | C6 * | 4/2005 | |

OTHER PUBLICATIONS

Translation EP-2801488 (Year: 2014).*
United States Patent and Trademark Office, "Requirement for Restriction/Election", issued in connection with U.S. Appl. No. 16/435,108, dated Aug. 11, 2021, 7 pages.
United States Patent and Trademark Office, "Non-Final Office Action", issued in connection with U.S. Appl. No. 16/435,108, dated Nov. 4, 2021, 24 pages.
United States Patent and Trademark Office, "Final Office Action", issued in connection with U.S. Appl. No. 16/435,108, dated Apr. 20, 2022, 30 pages.
United States Patent and Trademark Office, "Advisory Action", issued in connection with U.S. Appl. No. 16/435,108, dated Jul. 14, 2022, 3 pages.
United States Patent and Trademark Office, "Notice of Allowance and Fee(s) Due", issued in connection with U.S. Appl. No. 16/435,108, dated Jul. 14, 2022, 13 pages.
United States Patent and Trademark Office, "Notice of Allowance" issued in U.S. Appl. No. 16/435,108 dated Sep. 19, 2022, 13 pages.

* cited by examiner

METHODS AND APPARATUS FOR PAYLOAD ESTIMATION AND HITCH CONDITION DETECTION USING INTEGRATED SENSORS

RELATED APPLICATION

This patent arises from a divisional of U.S. patent application Ser. No. 16/435,108, (now U.S. Pat. No. 11,560,028) which was filed on Jun. 7, 2019. U.S. patent application Ser. No. 16/435,108 is hereby incorporated herein by reference in its entirety. Priority to U.S. patent application Ser. No. 16/435,108 is hereby claimed.

FIELD OF THE DISCLOSURE

This disclosure relates generally to vehicle hitches and, more particularly, to methods and apparatus for payload estimation and fault detection using hitch integrated sensors.

BACKGROUND

In recent years, consumer vehicles have increasingly been used for towing or hauling cargo. Consumer vehicles often have limits associated with the payloads capable of being hauled and towed by the vehicles. Operating outside of these limits can cause unnecessary wear and/or damage to the vehicle. Consumer vehicles capable of pulling trailers have implemented additional data processing capabilities.

SUMMARY OF INVENTION

An example apparatus disclosed herein includes a pin orientation determiner to determine a first orientation of a first pin and a second orientation of a second pin, the first pin and the second pin disposed within a hitch, and calculate a relative orientation of the first pin and the second pin based on the first orientation and the second orientation, and a hitch condition detector to determine if a physical change has occurred in the hitch by comparing the relative orientation to an installation orientation of the first pin and the second pin.

An example method disclosed herein includes determining a first orientation of a first pin and a second orientation of a second pin, the first pin and the second pin disposed within a hitch, calculating a relative orientation of the first pin and the second pin based on the first orientation and the second orientation, and determining if a physical change has occurred in the hitch by comparing the relative orientation to an installation orientation of the first pin and the second pin.

An example non-transitory machine-readable storage medium disclosed herein includes instructions which, when executed, cause a processor to at least determine a first orientation of a first pin and a second orientation of a second pin, the first pin and the second pin disposed within a hitch, calculate a relative orientation of the first pin and the second pin based on the first orientation and the second orientation, and determine if a physical change has occurred in the hitch by comparing the relative orientation to an installation orientation of the first pin and the second pin.

An example apparatus disclosed herein includes a hitch change detector to detect, via an accelerometer of a hitch, a pitch angle change of a vehicle, and a payload determiner to determine if a hitch load change occurred within a threshold time after the pitch angle change, and in response to determining the hitch load change occurred within the threshold time, calculate a weight associated with a payload within a bed of the vehicle based on a property of the vehicle.

An example method disclosed herein includes detecting, via an accelerometer of a hitch, a pitch angle change of a vehicle, determining if a hitch load change occurred within a threshold time after the pitch angle change, and in response to determining the hitch load change occurred within the threshold time, calculating a weight associated with a payload within a bed of the vehicle based on a property of the vehicle.

An example non-transitory machine-readable storage medium disclosed herein includes instructions which, when executed, cause a processor to at least detect, via an accelerometer of a hitch, a pitch angle change of a vehicle, determine if a hitch load change occurred within a threshold time after the pitch angle change, and in response to determining the hitch load change occurred within the threshold time, calculate a weight associated with a payload within a bed of the vehicle based on a property of the vehicle.

BRIEF DESCRIPTION OF THE DRAWINGS

The figures are not to scale. In general, the same reference numbers will be used throughout the drawing(s) and accompanying written description to refer to the same or like parts.

Figure 1:
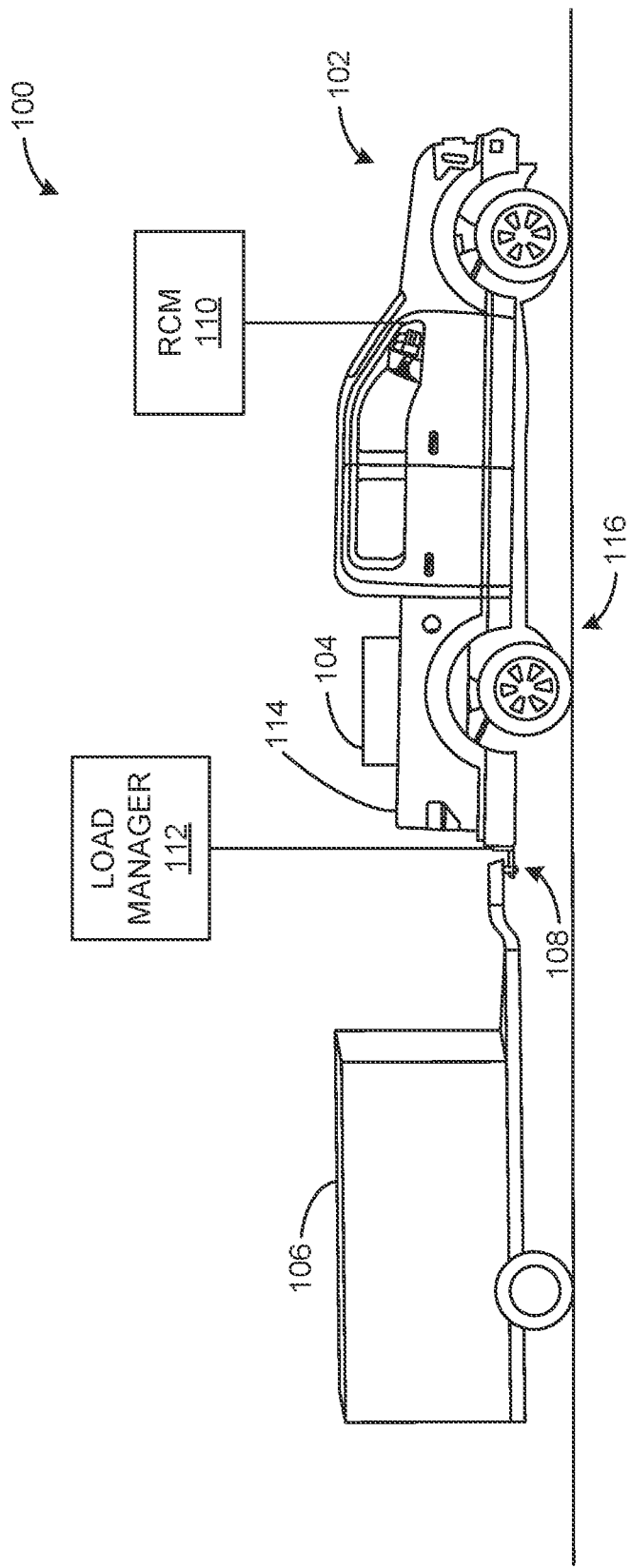
FIG. 1 illustrates an example system including a vehicle hauling a payload and towing a trailer in which the examples disclosed herein may be implemented.

Descriptors "first," "second," "third," etc. are used herein when identifying multiple elements or components which may be referred to separately. Unless otherwise specified or understood based on their context of use, such descriptors are not intended to impute any meaning of priority, physical order or arrangement in a list, or ordering in time but are merely used as labels for referring to multiple elements or components separately for ease of understanding the disclosed examples. In some examples, the descriptor "first" may be used to refer to an element in the detailed description, while the same element may be referred to in a claim with a different descriptor such as "second" or "third." In such instances, it should be understood that such descriptors are used merely for ease of referencing multiple elements or components.

DETAILED DESCRIPTION

Vehicles (e.g., trucks, etc.) often include external hitches coupled the rear of the vehicle. In some examples disclosed herein, the hitch includes one or more pins having magneto-elastic sensors to determine the force being applied via a trailer coupled to a receiver tube of the hitch. The pin(s) of the hitch can be used to determine a tongue weight and a towed weight of an attached trailer. An example of a hitch system with sensor pins is described in U.S. application Ser. No. 16/230,776, which is hereby incorporated herein by reference in its entirety.

In some examples, magneto-elastic pins use flux gates to measure a towed weight or load (e.g., the shear force) applied to the pins. In such examples, the flux gates are orientated such that they measure the load in the direction the load is applied. Accordingly, rotation of the pin(s) within the hitch can cause the magneto-elastic sensor(s) to record an incorrect tongue and/or towed weight. Accordingly, in some examples, the sensor pins include accelerometers to measure the orientations of the pins. However, because accelerometers measure the rotational orientations of the pins relative to gravity, a change in a measurement of the accelerometers cannot be differentiated between the vehicle operating on a grade and the rotation of the pins within the hitch.

In some examples, when a trailer is coupled to a hitch of a vehicle or a payload is disposed within a bed of the vehicle, the vehicle squats. As used herein, the terms "squat" and "squats" refer to the deflection of a rear portion of a vehicle (e.g., a downward deflection of a rear portion of a vehicle, an upward deflection of a front portion of a vehicle, etc.) caused by towing a trailer and/or hauling a payload. In some examples, vehicle squat can be caused by the compression and/or deflection of one or more suspension elements associated with the rear axle of a vehicle.

Examples disclosed herein address the above-noted problems using a hitch that includes two sensor pins with incorporated accelerometers. In some examples disclosed herein, a first pin includes a first accelerometer and a second sensor pin including a second accelerometer. In some examples disclosed herein, the first accelerometer and the second accelerometer are installed at an installation orientation. In some examples, the current relative orientation of pins can be determined by comparing the data from the accelerometers with respect to gravity. In such examples, if the current relative orientation is not the same as the installed orientation, a physical change can be inferred to have occurred in the hitch and/or vehicle. In some examples disclosed herein, the current relative orientation of the pins can be further compared to a vehicle orientation determined by an on-board accelerometer associated with the vehicle. In some examples herein, acceleration values from the first accelerometer and/or the second accelerometer can be used to determine a squat of the vehicle. In some examples disclosed herein, the payload disposed in the vehicle can be determined using the squat of the vehicle, a suspension property and/or a vehicle configuration.

FIG. 1 illustrates an example system 100 including an example vehicle 102 hauling an example payload 104 and towing an example trailer 106 in which the examples disclosed herein may be implemented. In the illustrated example of FIG. 1, the trailer 106 is coupled to the vehicle 102 via an example hitch 108. The system 100 further includes an example RCM 110 and an example load manager 112. While the RCM 110 and the load manager 112 are depicted as part of the hitch 108 and vehicle 102, respectively, the RCM 110 and load manager 112 can be implemented by any suitable component of the vehicle 102, the trailer 106, and/or the hitch 108. Additionally or alternatively, the RCM 110 and/or load manager 112 can be implemented by a computing device (e.g., a mobile phone, etc.) associated with a user of the vehicle 102.

In the illustrated example of FIG. 1, the trailer 106 is coupled to the vehicle 102 via a receiver tube of the hitch 108. In some examples, the trailer 106 is pivotally coupled to the hitch 108 via a tow ball. In the illustrated example, the vehicle 102 includes an open-air bed 114 disposed over a rear axle 116 of the vehicle 102. In other examples, the vehicle 102 can include an enclosed bed, a trunk and/or a cargo area behind the rear seats. In the illustrated example, the vehicle 102 is a pickup truck. In other examples, the vehicle 102 can be any other suitable type of vehicle (e.g., a commercial truck, a motorcycle, a motorized cart, an all-terrain vehicle, etc.)

In the illustrated example, the payload 104 is an item(s) loaded in the bed 114 of the vehicle 102. In the illustrated example, the payload 104 causes the vehicle 102 to squat by compressing and/or deflecting a suspension element of the rear axle 116 of the vehicle 102. In some examples, the payload 104 can be loaded in any other location that would cause the vehicle 102 to squat. For example, the payload 104 can be loaded in the trunk and/or rear seat of the vehicle 102.

The trailer 106 is a towed container coupled to the vehicle 102 via the hitch 108. In the illustrated example, the trailer 106 exerts a vertical load (e.g., a tongue load, etc.) on the vehicle 102. In some examples, the tongue load can cause the vehicle 102 to squat. In some examples, while the vehicle 102 is moving, the trailer 106 exerts a towed load on the vehicle 102. In some examples, the hitch 108 includes a first sensor pin and a second sensor pin. In some examples, the hitch 108, via the first sensor pin and/or the second sensor pin, can detect and measure the tongue load and/or towed load exerted by the trailer 106. In some examples, the hitch 108, via the first sensor pin and/or the second sensor pin, can detect and measure the pitch of the hitch 108. The example hitch 108 is described in greater detail in conjunction with FIG. 2.

The example RCM 110 is a system included in the vehicle 102 that controls safety features of the vehicle 102. In some examples, the RCM 110 includes sensors (e.g., accelerometers, etc.) and can receive inputs that cause the safety features to activate. In some examples, the RCM 110 is implemented as an electronic control unit (ECU) and can communicate with a main computer of the vehicle 102 and/or the load manager 112.

The load manager 112 receives load and/or pitch information from the hitch 108 and the RCM 110. For example, the load manager 112 can analyze the load information to determine the towed load, tongue load or and/or the load associated with the payload 104. In some examples, the load manager 112 can analyze the received load information to determine the squat of the vehicle 102. Further, the load manager 112 can determine the squat of the vehicle 102 based on pitch data (e.g., acceleration values, etc.) received from the hitch 108. In some examples, the load manager 112 can detect a load and/or pitch change associated with the coupling of the trailer 106 to the vehicle 102 and can analyze the received load/or pitch information to determine if a physical change in the hitch 108 and/or the vehicle 102 has occurred. For example, a physical change in the hitch 108 and/or the vehicle 102 can include a mechanical fault in the hitch 108 and/or any other change that causes an incorrect load to be measured by the load manager 112. Example mechanical faults include deformation of pin rotation prevention features of the hitch 108 (e.g., the rounding of a D-shaped restraining plate, etc.), the mechanical yielding of one or more parts of the hitch 108, the loosening of one or more fasteners associated with the hitch 108, etc. The example load manager 112 is described in greater detail in conjunction with FIG. 4.

Figure 2:
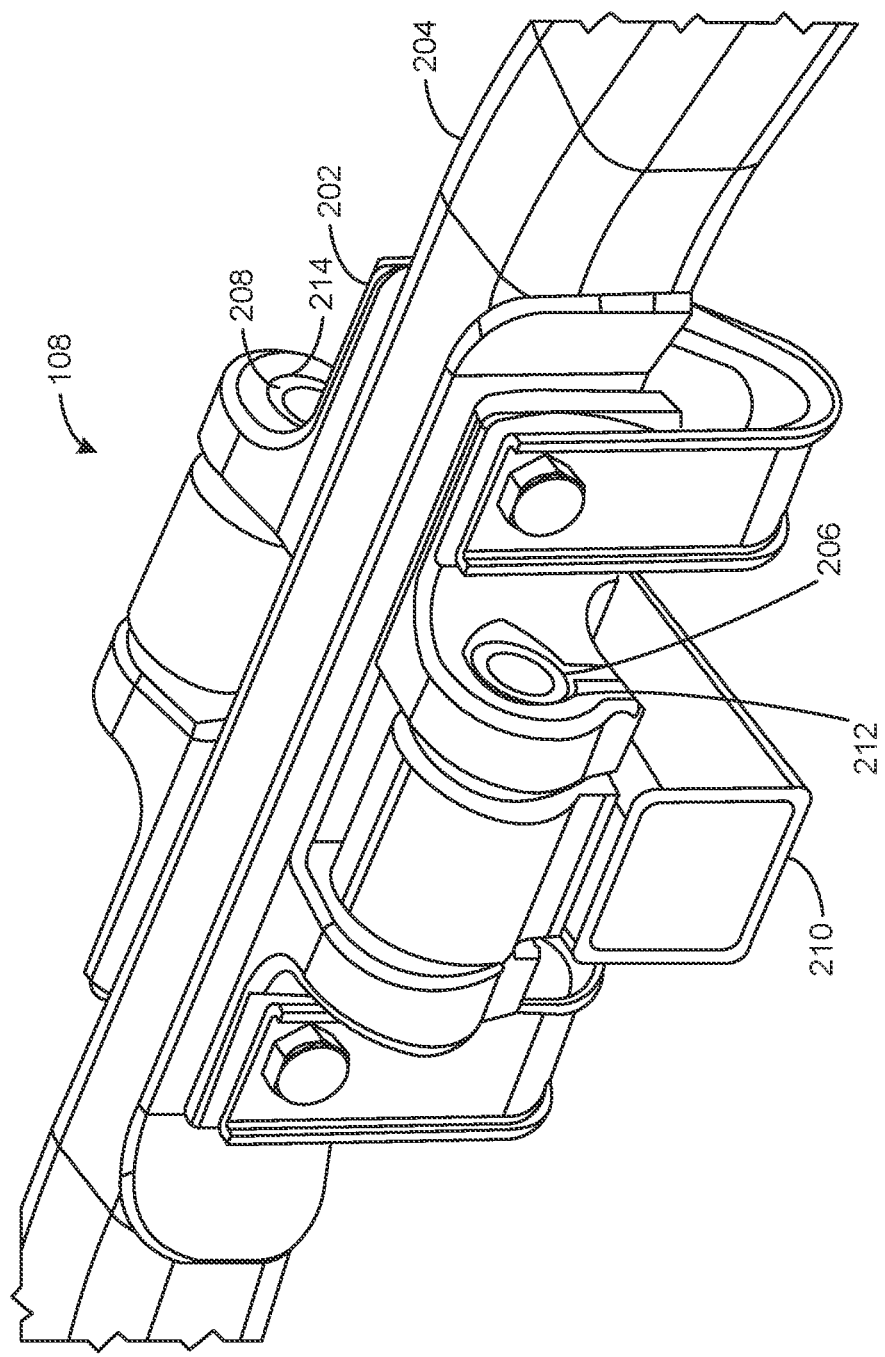
FIG. 2 illustrates an example hitch including sensor pins with which the examples disclosed herein may be implemented.

FIG. 2 illustrates the example hitch 108 of FIG. 1 in further detail. The example hitch 108 includes an example housing 202, an example crossbar 204, an example first sensor pin 206, an example second sensor pin 208 and an example receiver tube 210. While the illustrated example of FIG. 2 illustrates one potential configuration of the hitch 108, the hitch 108 can have any other suitable structure and/or design.

The housing 202 houses the first sensor pin 206 and the second sensor pin 208. In the illustrated example, the housing 202 is coupled to the receiver tube 210 via a weld, a press fit, one or more fasteners and/or any other similar means. In the illustrated example of FIG. 2, the housing 202 is a single continuous part. In other examples, the housing 202 can be composed any number discrete pieces (e.g., 2 parts, etc.). Additionally, the housing 202 is coupled to the crossbar 204 via fasteners (e.g., bolts, screws, etc.). In other examples, any other suitable means of coupling the housing 202 to the crossbar 204 can be used (e.g., a weld, a press fit, etc.). In some examples, the housing 202 is shaped to prevent the first sensor pin 206 and/or the second sensor pin 208 from rotating. For example, the housing 202 can have a D-shaped adapter at the one or both ends of apertures 212, 214 receiving the first sensor pin 206 and/or the second sensor pin 208. In some examples, one or both of the apertures 212, 214 can include any other suitable restraining features to prevent the sensor pins 206, 208 from rotating within the housing 202. Additionally or alternatively, the housing 202 can include any other suitable features (e.g., teeth, etc.) to prevent the sensor pins 206, 208 from rotating within the housing 202. The example housing 202 can be composed of metal or any combination of metals (e.g., steel, aluminum, etc.), composites (e.g., carbon fiber, etc.), plastics and/or any other suitable materials.

The crossbar 204 is a structural element that connects the housing 202 to the vehicle 102. In the illustrated example, the crossbar 204 has a filleted square cross-section. In other examples, the crossbar 204 can have any other suitable cross-section (e.g., quadrilateral, polygonal, circular, ovoid, etc.). In the illustrated example, the crossbar 204 is a single continuous tube disposed in the housing 202. In other examples, the crossbar 204 can be composed of two or more structural elements. The example crossbar 204 can be composed of metal or any combination of metals (e.g., steel, aluminum, etc.), composites (e.g., carbon fiber, etc.), plastics and/or any other suitable materials.

The first sensor pin 206 and the second sensor pin 208 are disposed with the example housing 202 and include force sensing elements (e.g., magnetoelastic sensors, strain gages, load cells, hydraulic load cells, etc.) and accelerometers. In some examples, when considered individually, the sensor pins 206, 208 are capable of measuring forces in two directions. In the illustrated example, when used together, the sensor pins 206, 208 can measure the forces in three directions, including the tongue load (e.g., a load applied in a direction orthogonal to the ground, etc.), the towed load (e.g., a load applied in a direction parallel to the receiver tube 210, etc.), and the longitudinal load (e.g., a load applied in a direction parallel to the crossbar 204, etc.). In the illustrated example, the sensor pins 206, 208, via the incorporated accelerometers, can detect an orientation of the hitch 108 and/or the sensor pins 206, 208, etc. In the illustrated example, the first sensor pin 206 and the second sensor pin 208 are configured within the hitch 108 such that the first sensor pin 206 and the second sensor pin 208 form part of the only load path between the trailer 106 and the vehicle 102. In the illustrated example, the first sensor pin 206, the second sensor pin 208 and the housing 202 are configured such that the relative orientation of the sensor pins 206, 208 remains constant unless a physical change occurs (e.g., the housing 202 is rigid, etc.).

In the illustrated example of FIG. 2, the sensor pins 206, 208 have substantially the same lengths, cross-sections, load ratings and diameters. In other examples, the sensor pins 206, 208 can have different lengths, cross-sections, load ratings, and/or diameters. In some examples, the first sensor pin 206 and/or the second sensor pin 208 can have a have a hollow cross-section. In some examples, the first sensor pin 206 and the second sensor pin 208 are composed of a ferrous material (e.g., high strength steel, etc.). In other examples, the sensor pin 206 and the second sensor pin 208 can be any other suitable material. In some examples, the sensor pins 206, 208 are at substantially the same vertical position relative to the crossbar 204.

The receiver tube 210 enables the trailer 106 to be coupled to the vehicle 102. For example, a tow ball can be coupled to the hitch 108 via the receiver tube 210. The coupled tow ball enables the trailer 106 to be pivotally coupled to the vehicle 102 via the hitch 108. In other examples, any other suitable coupling element (e.g., a tow bar, etc.) can be coupled to the hitch 108 via the receiver tube 210. In some examples, the hitch 108 can be further coupled to the trailer 106 via one or more chains.

Figure 3:
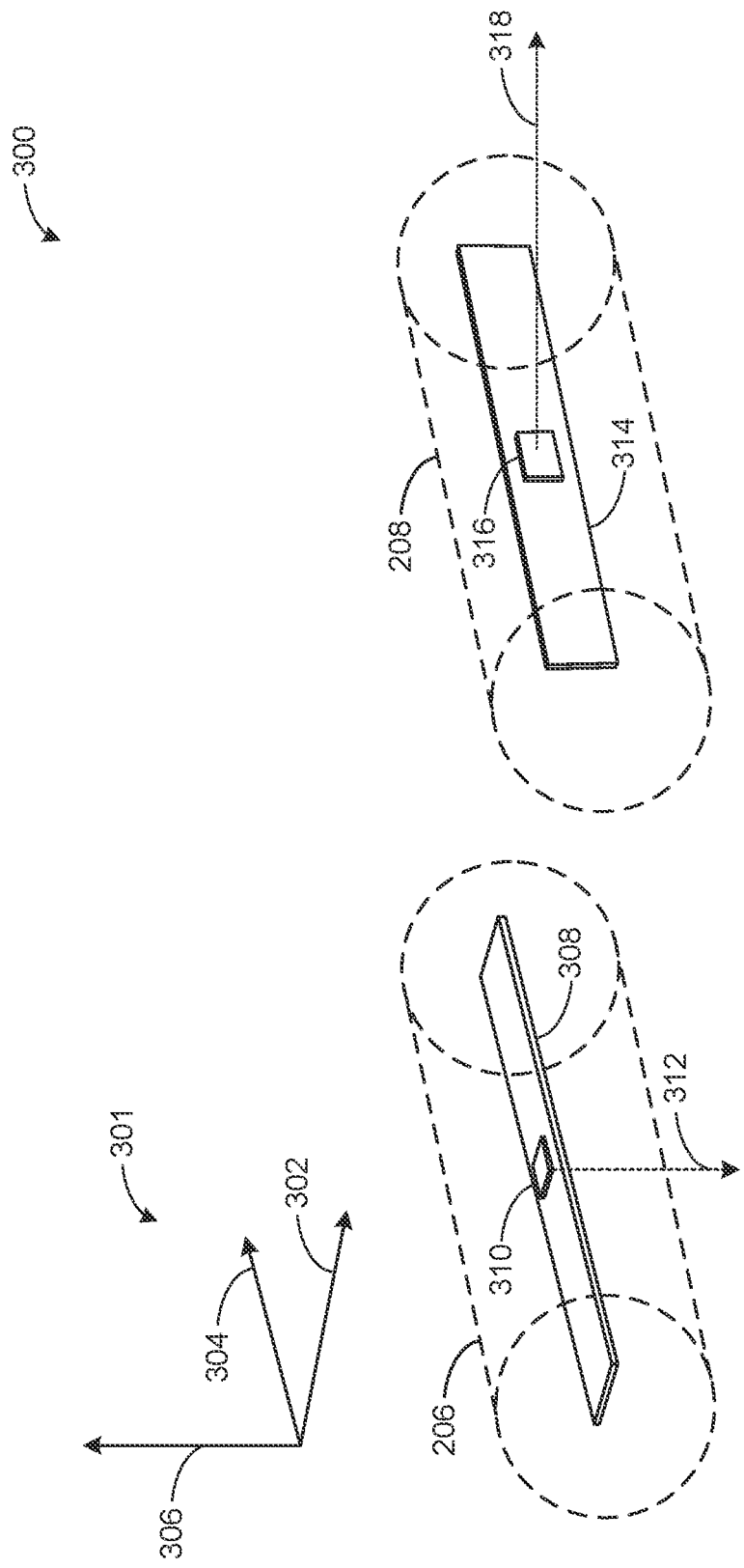
FIG. 3 illustrates example interior views of the sensor pins of FIG. 2.

FIG. 3 illustrates example interior views 300 of the sensor pins 206, 208 of FIG. 2. In the illustrated example of FIG. 3, the example sensors pins 206, 208 are illustrated as transparent with dashed lines indicating the physical boundaries of the sensors pins 206, 208 such that the internal components of the sensor pins 206, 208 are visible within. In the illustrated example of FIG. 3, the sensor pins 206, 208 are depicted as continuous solid structures. In some examples, one or both of the sensor pins 206, 208 can be any other suitable shape (e.g., hollow, tubular, including insert holes, etc.). In some examples, one or both of the sensors pins 206, 208 can be assemblies of multiple parts.

In the illustrated example of FIG. 3, an example coordinate system 301 includes an example x-axis 302, an example y-axis 304 and an example z-axis 306. In the illustrated example of FIG. 3, the x-axis 302 corresponds to a horizontal direction (e.g., a direction to parallel to the receiver tube 210, etc.). The example y-axis 304 corresponds to a lateral direction (e.g., a direction parallel to the crossbar 204, etc.). The example z-axis to a vertical direction (e.g., a direction orthogonal to the ground, etc.). The example first sensor pin 206 includes an example first circuit board 308 and an example first accelerometer 310 that has an example first accelerometer orientation 312. The example second sensor pin 208 includes an example second circuit board 314 and an example second accelerometer 316 that has an example second accelerometer orientation 318.

The circuit boards 308, 314 are printed circuit boards that include the sensors of the sensors pins 206, 208, respectively. In the illustrated example of FIG. 3, the example circuit boards 308, 314 include the accelerometers 310, 316 and can further include any other suitable sensors and/or electronics. For example, the circuit boards 308, 314 can include force sensors, load sensors, additional accelerometers, flux gates, temperature sensors, integrated circuit (IC) chips, etc. In some examples, the circuit boards 308, 314 include a carrier piece to facilitate the coupling of the circuit boards 308, 314 within the sensors pins 206, 208. In some examples, some or all of the example load manager 112 can be implemented via the first circuit board 308 and/or the second circuit board 314. In some examples, the circuit boards 308, 314 can be inserted into axial holes of the sensor pins 206, 208. In some examples, the sensor pins 206, 208 can be assembled around the circuit boards 308, 314.

In the illustrated example of FIG. 3, the accelerometers 310, 316 are single-axis electromechanical accelerometers. The first accelerometer 310 measures the acceleration experienced by the first sensor pin 206 in the first accelerometer orientation 312. In the illustrated example of FIG. 3, the first accelerometer orientation 312 is oriented along the z-axis 306. In such examples, the first accelerometer 310 measures the acceleration experienced by the first sensor pin 206 in the z-direction (e.g., the acceleration due to gravity). The example second accelerometer 316 measures the acceleration experienced by the second sensor pin 208 in the second accelerometer orientation 318. In the illustrated example of FIG. 3, the second accelerometer orientation 318 is oriented along the x-axis 302. In such examples, the second accelerometer 316 measures the acceleration experienced by the first sensor pin 206 in the x-direction (e.g., the acceleration of the vehicle 102). In some examples, the example accelerometers 310, 316 can be multi-axis accelerometers. In some examples, the example accelerometers 310, 316 are piezoelectric accelerometers. In other examples, the example accelerometers 310, 316 can be any other suitable type of accelerometers.

In some examples, the accelerometer orientations 312, 318 correspond to the orientation of the sensor pins 206, 208. In some examples, if the sensor pins 206, 208 rotate within the hitch 108, the accelerometers orientations 312, 318 rotate a proportional amount. In some examples, a change in the first accelerometer orientation 312 can be associated with a change in the orientation (e.g., rotational position, etc.) of the first sensor pin 206. In some examples, a change in the second accelerometer orientation 318 is associated with a change in the orientation (e.g., rotational position, etc.) of the second sensor pin 208.

In the illustrated example of FIG. 3, the interior views 300 correspond to the condition (e.g., the installation orientation, etc.) of the sensor pins 206, 208 as the sensors pins 206, 208 were installed in the hitch 108. An example installation orientation of the sensor pins 206, 208 is discussed in further detail below in conjunction with FIG. 6A. In some examples, the directions of the accelerometer orientations 312, 318 can change relative to the coordinate system 301 based on a grade of a driving surface on which the vehicle 102 is located, the addition of the payload 104 to the vehicle 102, the coupling of the trailer 106 to the hitch 108, the occurrence of a physical change in the hitch 108 and/or the vehicle 102, etc. An example orientation of the sensor pins 206, 208 while the vehicle 102 is on grade and/or the vehicle is loaded with a load is discussed in greater detail below in conjunction with FIG. 6B.

In some examples, the directions of the example accelerometer orientations 312, 318 can change relative to each other based on the occurrence of a physical change in the hitch 108 and/or vehicle 102. For example, in the illustrated example of FIG. 3, the accelerometer orientations 312, 318 are oriented at 90 degrees relative to one another (e.g., example first accelerometer orientation 312 is oriented in the negative z-direction and the example second accelerometer orientation 318 is oriented in the positive x-direction, etc.). In such examples, if a physical change in the hitch 108 and/or vehicle 102 has occurred, the accelerometer orientations 312, 318 can be oriented at a non-orthogonal orientation relative to one another. An example orientation of the sensor pins 206, 208 after a physical change in the hitch 108 and/or vehicle 102 has occurred is discussed in greater detail below in conjunction with FIG. 6C.

Figure 4:
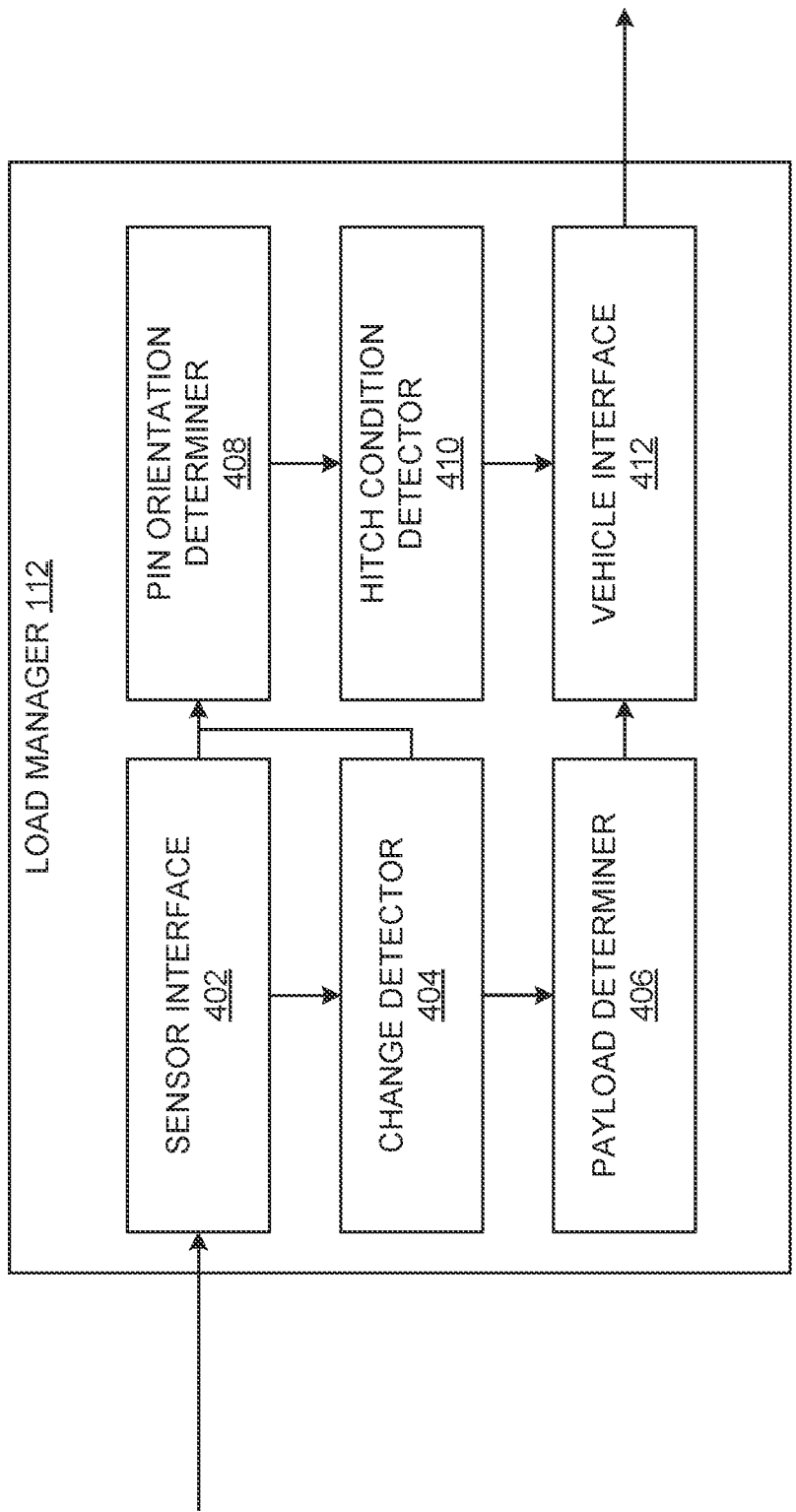
FIG. 4 is a block diagram detailing the load manager of FIG. 1.

FIG. 4 is an example block diagram detailing the load manager 112 of FIG. 1. The load manager 112 includes an example sensor interface 402, an example change detector 404, an example payload determiner 406, an example pin orientation determiner 408, an example hitch condition detector 410, and an example vehicle interface 412.

The sensor interface 402 receives data from sensors associated with the hitch 108 and/or the RCM 110. For example, the sensor interface 402 can receive input from the sensor pins 206, 208, an accelerometer associated with the RCM 110 and/or any other sensors associated with the hitch 108 and/or vehicle 102. In some examples, the sensor interface 402 can facilitate communication between the change detector 404, the example payload determiner 406, the pin orientation determiner 408, the hitch condition detector 410 and/or the vehicle interface 412. In some examples, the sensor interface 402 can convert the received signal from the sensor(s) into a numerical form (e.g., human readable, etc.). For example, if the sensor pins 206, 208 output analog signals (e.g., an analog voltage, an analog current, etc.) the sensor interface 402 can convert the received signals into data values corresponding to a towed load, a tongue load, a longitudinal load and/or orientation (e.g., the pitch, etc.) of the sensor pins 206, 208.

The example change detector 404 analyzes the received sensor data to determine if a towed load and/or tongue load has been applied to the vehicle 102 (e.g., caused by the coupling of the trailer 106, etc.) For example, the change detector 404 can detect changes in the signal associated with the towed load and/or tongue load. In some examples, the change detector 404 can determine when a change in the tongue load and/or the towed load occurred. In some examples, the change detector 404 can determine a time at which when a pitch change of the sensor pins 206, 208 occurred. In some examples, the change detector 404 can store the determined time in a memory associated with the load manager 112.

The example payload determiner 406 determines if a payload (e.g., the payload 104 of FIG. 1) has been added to the vehicle 102. In some examples, the payload determiner 406 can determine the load associated with the payload 104. For example, the payload determiner 406 can determine if a pitch change of the hitch 108 occurred at the same time as a change in tongue load and/or towed load. In examples where a pitch change occurred within a threshold time period of change in the tongue load and/or towed load, the payload determiner 406 can determine the pitch change is associated with the coupling of a trailer to the vehicle 102. In examples where the pitch change occurred outside of the threshold time period or no hitch load was detected, the payload determiner 406 can determine the payload 104 has been added to the vehicle 102. In some examples, the payload determiner 406 can calculate the load associated with the payload 104 based on the pitch change associated with the sensor pins 206, 208, a configuration of the vehicle 102 and/or a suspension property (e.g., a stiffness of an elastic element of the suspension, etc.) of the vehicle 102. For example, the payload determiner 406 can determine the load based on an empirically derived squat to payload relationship. For example, the payload determiner 406 can calculate the payload based on the payload being proportional to the squat of the vehicle 102, and a suspension-squat constant. In some examples, the suspension-squat constant is the load associated with one degree of squat change. In other examples, the suspension-squat constant can be any suitable value or calculated by any suitable equation. In some examples, the payload determiner 406 can determine the load associated with the payload by any other suitable method (e.g., a lookup table, etc.). In some examples, the payload determiner 406 does not use sensors associated with the suspension system of the vehicle 102 (e.g., a ride height sensor, an elastic element sensor, etc.).

The example pin orientation determiner 408 determines the relative orientation of the sensor pins 206, 208 by comparing the pitch data received from the accelerometers of the sensor pins 206, 208. For example, the pin orientation determiner 408 can determine the orientation of the first sensor pin 206 using pitch data from the first sensor pin 206 and the acceleration associated with gravity, (e.g., g, etc.). For example, the pin orientation determiner 408 can determine the orientation of the second sensor pin 208 using the pitch data from the first sensor pin 206 and the acceleration associated with gravity. In some examples, the pin orientation determiner 408 can determine the relative orientation of the sensor pins 206, 208 using the orientation of the first sensor pin 206 (e.g., the orientation of an accelerometer within the first sensor pin 206, etc.) and the orientation of the second sensor pin 208 (e.g., the orientation of an accelerometer within the second sensor pin 208, etc.).

In some examples, the pin orientation determiner 408 can compare the relative orientation of the pins with the installation orientation of the sensor pins 206, 208. In such examples, the pin orientation determiner 408 can retrieve the installation orientation of the sensor pins 206, 208 from a memory associated with the hitch 108, the vehicle 102, the load manager 112, etc. In some examples, the installation orientation of the sensor pins 206, 208 is 90 degrees. In some examples, pin orientation determiner 408 can determine the difference between the installed orientation and the relative orientation. For example, the pin orientation determiner 408 can determine the difference by subtracting the relative orientation of the sensor pins 206, 208 from the installation orientation of the sensor pins 206, 208. In other examples, the pin orientation determiner 408 can determine the difference between the installation orientation of the sensor pins 206, 208 and the relative orientation of the sensor pins 206, 208 using any other suitable equation and/or method.

The example hitch condition detector 410 determines if a physical change in the vehicle 102 and/or hitch 108 has occurred. For example, the hitch condition detector 410 can analyze the difference between the installation orientation and relative orientation. In some examples, if the difference between the installation orientation and relative orientation satisfies a threshold (e.g., substantially equal to zero degrees, etc.), the hitch condition detector 410 can determine no fault has occurred. In other examples, if the difference between the installation orientation and relative orientation does not satisfy the threshold, the hitch condition detector 410 can determine a physical change in the vehicle 102 and/or hitch 108 has occurred.

The vehicle interface 412 communicates with a computer associated with the vehicle 102. For example, if the hitch condition detector 410 determines a fault has occurred, the vehicle interface 412 can cause a user interface (e.g., a display, etc.) associated with the vehicle 102 to present an alert to a user of the vehicle 102. In some examples, the vehicle interface 412 can further cause a user interface to present the determined squat, the determined tongue load, the determined towed load, the determined load associated with the payload 104, etc. In some examples, the vehicle interface 412 can retrieve or send any other suitable information associated with the vehicle 102, hitch 108, etc.

While an example manner of implementing the load manager 112 of FIG. 1 is illustrated in FIG. 4, one or more of the elements, processes and/or devices illustrated in FIG. 4 may be combined, divided, re-arranged, omitted, eliminated and/or implemented in any other way. Further, the example sensor interface 402, the example change detector 404, the example payload determiner 406, the example pin orientation determiner 408, the example hitch condition detector 410 and/or, more generally, the example load manager 112 of FIG. 1 may be implemented by hardware, software, firmware and/or any combination of hardware, software and/or firmware. Thus, for example, any of the example sensor interface 402, the example change detector 404, the example payload determiner 406, the example pin orientation determiner 408, the example hitch condition detector 410 and/or, more generally, the example load manager 112 could be implemented by one or more analog or digital circuit(s), logic circuits, programmable processor(s), programmable controller(s), graphics processing unit(s) (GPU(s)), digital signal processor(s) (DSP(s)), application specific integrated circuit(s) (ASIC(s)), programmable logic device(s) (PLD(s)) and/or field programmable logic device(s) (FPLD(s)). When reading any of the apparatus or system claims of this patent to cover a purely software and/or firmware implementation, at least one of the example, sensor interface 402, the example change detector 404, the example payload determiner 406, the example pin orientation determiner 408, and/or the example hitch condition detector 410 is/are hereby expressly defined to include a non-transitory computer readable storage device or storage disk such as a memory, a digital versatile disk (DVD), a compact disk (CD), a Blu-ray disk, etc. including the software and/or firmware. Further still, the example load manager 112 of FIG. 1 may include one or more elements, processes and/or devices in addition to, or instead of, those illustrated in FIG. 4, and/or may include more than one of any or all of the illustrated elements, processes and devices. As used herein, the phrase "in communication," including variations thereof, encompasses direct communication and/or indirect communication through one or more intermediary components, and does not require direct physical (e.g., wired) communication and/or constant communication, but rather additionally includes selective communication at periodic intervals, scheduled intervals, aperiodic intervals, and/or one-time events.

Figure 5A:
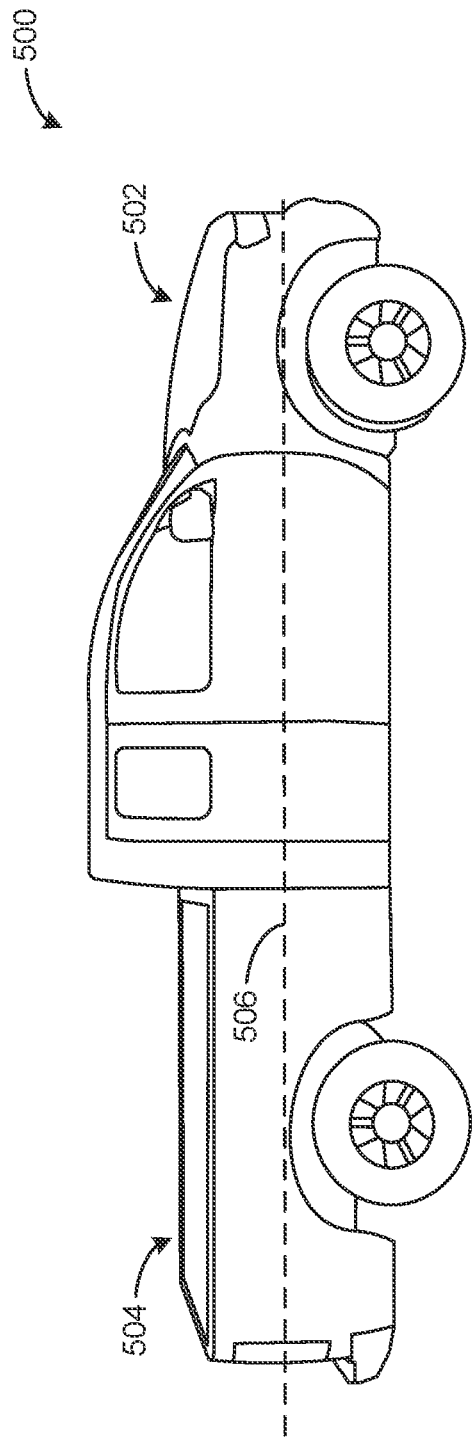
FIG. 5A illustrates an example loading condition of a vehicle with a payload or a trailer.

FIG. 5A illustrates an example loading condition 500 of an example vehicle 502. The vehicle 502 includes an example bed 504 and an example center line 506. In some examples, the vehicle 502 can correspond with the vehicle 102 of FIG. 1. In the illustrated example of FIG. 5A, the vehicle 502 is not hauling any payload in the bed 504. In the illustrated example, the vehicle 502 is not experiencing any squat (e.g., the rear suspension is not more compressed than the front suspension of the vehicle 102, etc.). In the illustrated example, the center line 506 is parallel to the driving surface.

Figure 5B:
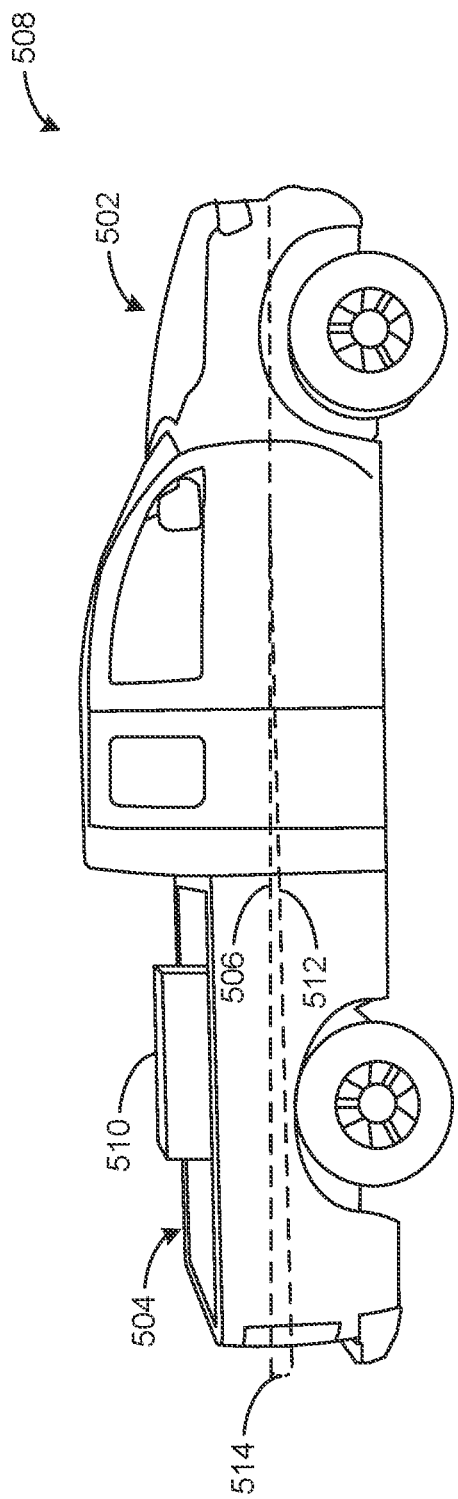
FIG. 5B illustrates an example loading condition of a vehicle caused by a payload disposed in the bed of the vehicle.

FIG. 5B illustrates an example loading condition 508 of the example vehicle 502 of FIG. 5A caused by an example payload 510 loaded in the bed 504 of the vehicle 502. The example loading condition 508 is caused by the example payload 510 and causes an example deflection 512 from the center line 506 and an example squat 514. In the illustrated example, the deflection 512 is caused by the payload 510 compressing one or more suspension elements of the vehicle 102. In some examples, the load manager 112 can determine the weight of the payload 104 based on the squat 514 and a property of the vehicle 502 (e.g., a stiffness of the rear suspension of the vehicle, a configuration of the vehicle 502, etc.). In some examples, the squat 514 can be determined by the pitch data received from the accelerometers of the first sensor pin 206 and/or the second sensor pin 208.

Figure 6A:
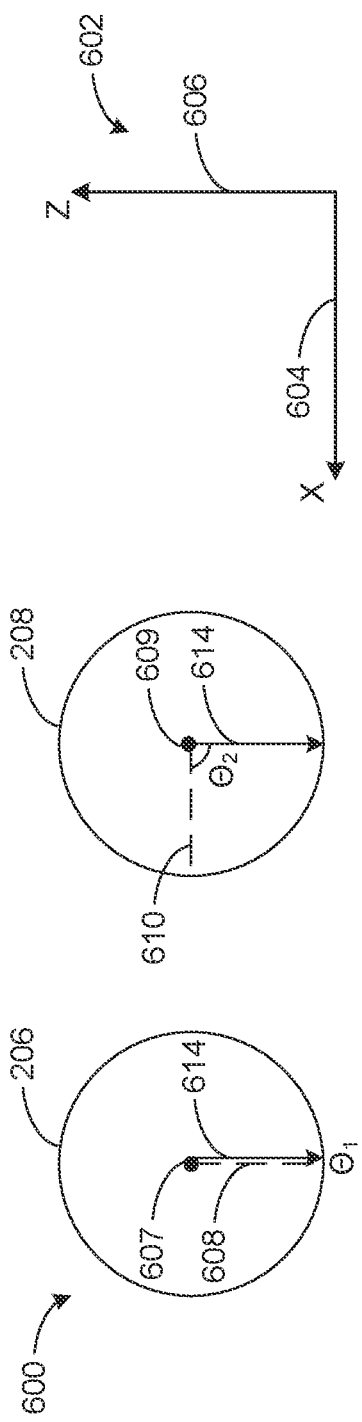
FIGS. 6A-6C illustrate example configurations of the sensor pins of FIG. 2.

FIG. 6A illustrates an example configuration 600 of the sensor pins 206, 208 of FIG. 2 corresponding to a vehicle on a flat surface. In the illustrated example of FIG. 6A, an example vehicle orientation 602 corresponds to the orientation of a vehicle on a flat surface (e.g., the orientation as determined by the on-board accelerometer of the vehicle 102, etc.) and includes an example X-axis 604 (e.g., an axis in the parallel to the driving surface, etc.) and an example Z-axis 606 (e.g., an axis orthogonal to the driving surface, etc.). The first sensor pin 206 includes an example first accelerometer 607 with an example first accelerometer orientation 608 aligned with the Z-axis 606 and the example second sensor pin 208 includes an example second example accelerometer 609 with an example second accelerometer orientation 610 aligned with the X-axis 604. In the illustrated example of FIG. 6A, the sensor pins 206, 208 are subjected to an acceleration due to gravity (e.g., g, etc.) which is illustrated as an example gravity vector 614. In some examples, the accelerometers 607, 609 correspond to the accelerometers 310, 316 of FIG. 3.

In some examples, the accelerometers 607, 609 measure the magnitude of acceleration experienced by the sensor pins 206, 208 occurring in the directions of the accelerometer orientations 608, 610. In some examples, when the vehicle 102 is stationary, the sensor pins 206, 208 are only subjected to the acceleration due to gravity. Accordingly, the relationship between the acceleration due to gravity and the magnitude of the acceleration value measured by the first accelerometer 607 can be determined via trigonometric relationships. In some examples, the acceleration value measured by the first accelerometer 607 is proportional to the acceleration due to gravity and the angle between the accelerometer orientation 608 and the gravity vector 614 (e.g., $\theta_1$, etc.). Similarly, the relationship between the acceleration due to gravity and the magnitude of acceleration value measured by the second accelerometer 609 can be determined via trigonometric relationships. In some examples, the acceleration value measured by the second accelerometer 609 is proportional to the acceleration due to gravity and the angle between the second accelerometer orientation 610 and the gravity vector 614 (e.g., $\theta_2$, etc.). The relationship of the acceleration value measured by the first accelerometer 607 and the gravity vector 614 and the acceleration value measured by the second accelerometer 609 and the gravity vector 614 can be used to calculate the angle between the first accelerometer orientation 608 and the gravity vector 614 and the second accelerometer orientation 610 and the gravity vector 614, respectively:

$$\theta_1 = \cos^{-1}\left(\frac{a_{first}}{g}\right) \quad (1)$$

$$\theta_2 = \cos^{-1}\left(\frac{a_{second}}{g}\right) \quad (2)$$

where $\theta_1$ is the angle between the first accelerometer orientation 608 and the gravity vector 614, $\theta_2$ is the angle between the second accelerometer orientation 610 and the gravity vector 614, $\alpha_{first}$ is the acceleration value measured by the first accelerometer 607, $\alpha_{second}$ is the acceleration value measured by the second accelerometer 609, and g is the acceleration due to gravity. In some examples, the relative orientation of the sensor pins 206, 208 (e.g., the current orientation of the pins, etc.) can be determined based on the difference between $\theta_1$ and $\theta_2$. In some examples, the relative orientation of the sensor pins 206, 208 can be compared to the installation orientation of the sensor pins 206, 208 to determine if a physical change in the hitch 108 and/or vehicle 102 has occurred.

Additionally or alternatively, the acceleration value measured by the first accelerometer 607 or the second accelerometer 609 can be used to verify the acceleration value measured by the other accelerometer. For example, if the accelerometers 607, 609 are installed orthogonally (e.g., the angular difference between the first accelerometer orientation 608 and the second accelerometer orientation 610 is equal to 90 degrees, etc.), the acceleration value measured by the first accelerometer 607 can be used to verify the acceleration value of the second accelerometer 609 using Equation (3):

$$\alpha_{second,estimated} = g \sin \theta_1 \quad (3)$$

where $\alpha_{second,estimated}$ is the estimated acceleration value determined using $\theta_1$. Similarly, if the accelerometers 607, 609 are installed orthogonally (e.g., $\Delta\theta_{intall}$ is equal to 90 degrees, etc.), the acceleration value measured by the second accelerometer 609 can be used to verify the acceleration value measured by the second accelerometer 609 using Equation (4):

$$\alpha_{first,estimated} = g \sin \theta_2 \quad (4)$$

Accordingly, the estimated acceleration values (e.g., $\alpha_{first,estimated}$, $\alpha_{second,estimated}$, etc.) determined via Equations (3) and/or (4) can be compared to the values measured via the accelerometer 608 and/or the second accelerometer 610. In such examples, the difference between the estimated acceleration value and the measured acceleration value can be compared to a threshold to determine if the sensor pins 206, 208 have been displaced from the installation orientation. In some examples, if the pins 206, 208 are not installed at a non-orthogonal orientation, other equations can be used to verify the acceleration values of the pins 206, 208.

Returning to the configuration 600 of FIG. 6A, the sensor pins 206, 208 have not rotated from the installation orientation (e.g., the accelerometers orientations 608, 610 are orthogonally oriented, etc.). In the illustrated example of FIG. 6A, the first accelerometer 607 measures an acceleration value of g and the pin orientation determiner 408 can solve Equation (1) to determine that $\theta_1$ is 0 degrees. In the illustrated example of FIG. 6A, the accelerometer 609 measures an acceleration value of 0 and the pin orientation determiner 408 can solve Equation (2) to determine that $\theta_2$ is 90 degrees. In some examples, the pin orientation determiner 408 can compare $\theta_1$ and $\theta_2$ (e.g., determine the difference, etc.) to determine that the current relative orientation of the pins is 90 degrees. Accordingly, the pin orientation determiner 408 can compare the current relative orientation of the sensor pins 206, 208 to the installed orientation of the sensor pins 206, 208. In the illustrated example of FIG. 6A, because the sensor pins 206, 208 have not been displaced from the installation orientation, the hitch condition detector 410 determines that no fault has occurred.

Figure 6B:
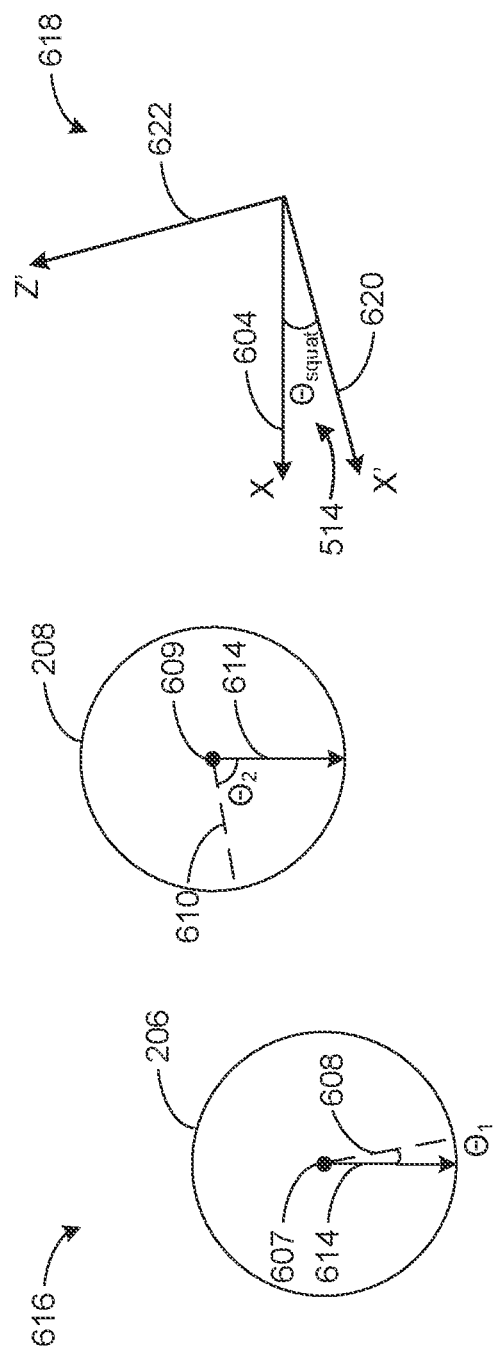

FIG. 6B illustrates an example configuration 616 of the sensor pins 206, 208 of FIG. 2 corresponding to a vehicle on a sloped surface and/or experiencing a squat. In the illustrated example of FIG. 6B, the vehicle orientation 618 includes an example X'-axis 620, an example Z'-axis 622 and the example X-axis 604. The example configuration 616 includes the example first sensor pin 206 with the example first accelerometer 607 in the example first accelerometer orientation 608 aligned with the Z'-axis 622. The example configuration 616 further includes the example second sensor pin 208 with the second accelerometer 609 in the example second accelerometer orientation 610 aligned with the X'-axis 620. In the illustrated example of FIG. 6B, the sensor pins 206, 208 are subjected to an acceleration due to gravity (e.g., g, etc.), which is illustrated as an example gravity vector 614.

In some examples, the vehicle orientation 618 can correspond to the orientation of a vehicle on a sloped surface (e.g., the orientation as determined by the accelerometer of the vehicle 102, etc.). In other examples, the vehicle orientation 618 can correspond to the orientation of a vehicle experiencing a squat (e.g., the vehicle 502 of FIG. 5B, etc.). In such examples, the example X-axis 604 corresponds to the example center line 506 of FIGS. 4A and 4B, the example X'-axis 620 corresponds to the example deflection line of 512 and the angle between X'-axis 620 and the X-axis 604 (e.g., $\theta_{squat}$, etc.) is the example squat 514. In such examples, the example squat 514 can be determined based on the angle between the first accelerometer orientation 608 and the gravity vector 614.

In the illustrated example of FIG. 6B, the sensor pins 206, 208 have not rotated from the installation orientation (e.g., the sensor pins 206, 208 are orthogonally oriented, etc.) but the angles between the accelerometer orientations 608, 610 and the gravity vector 614 (e.g., $\theta_1$, $\theta_2$, etc.) have changed when compared to the configuration of FIG. 6A. In the illustrated example of FIG. 6B, the first accelerometer 607 measures a non-zero first acceleration value and the pin orientation determiner 408 solves Equation (1) to determine $\theta_1$. In the illustrated example of FIG. 6B, the accelerometer 610 measures a second non-zero acceleration value and the pin orientation determiner 408 solves Equation (2) to determine $\theta_2$. In some examples, the pin orientation determiner 408 can compare the difference between $\theta_1$ and $\theta_2$ to determine that the current relative orientation of the pins is 90 degrees. Accordingly, the pin orientation determiner 408 can compare the current relative orientation of the sensor pins 206, 208 to the installed orientation of the sensor pins 206, 208. In the illustrated example of FIG. 6B, because the sensor pins 206, 208 have not been displaced from the installation orientation, the hitch condition detector 410 determines that no fault has occurred.

Figure 6C:
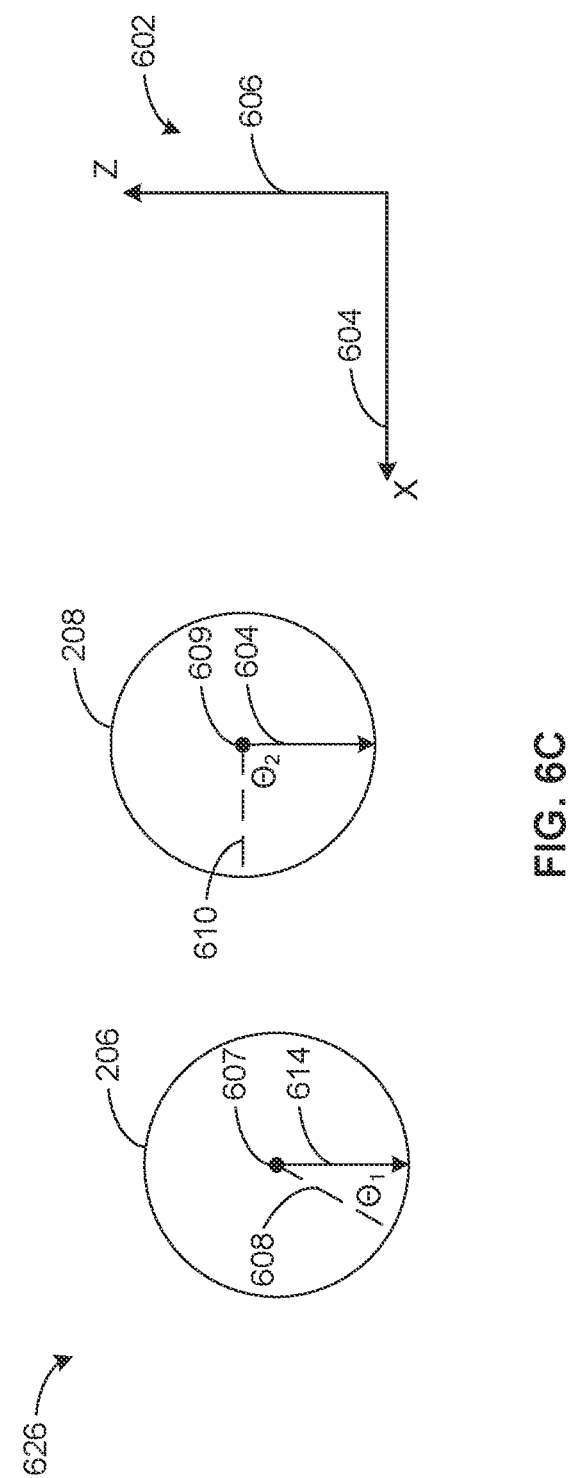

FIG. 6C illustrates an example configuration 626 of the sensor pins 206, 208 of FIG. 2 corresponding to a vehicle in which a physical change in the hitch 108 has occurred. In the illustrated example of FIG. 6C, the vehicle orientation 602 includes the example X-axis 604 and the example Z-axis 606. In the illustrated example of FIG. 6C, the sensor pins 206, 208 have rotated from the installation orientation (e.g., a physical change has occurred in the hitch 108 and/or vehicle 102, etc.). In the illustrated example of FIG. 6B, the first accelerometer 607 measures a non-zero first acceleration value and the pin orientation determiner 408 solves Equation (1) to determine $\theta_1$. In the illustrated example of FIG. 6C, the second accelerometer 609 measures a second non-zero acceleration value and the pin orientation determiner 408 solves Equation (2) to determine $\theta_2$. In some examples, the pin orientation determiner 408 can compare $\theta_1$ and $\theta_2$ to determine the current relative orientation of the sensor pins 206, 208. The pin orientation determiner 408 solves compare the current relative orientation of the sensor pins 206, 208 to the installed orientation of the sensor pins 206, 208. In the illustrated example of FIG. 6C, because the sensor pins 206, 208 have been displaced from the installation orientation, the condition detector 410 determines that a physical change in the hitch 108 has occurred.

Figure 7:
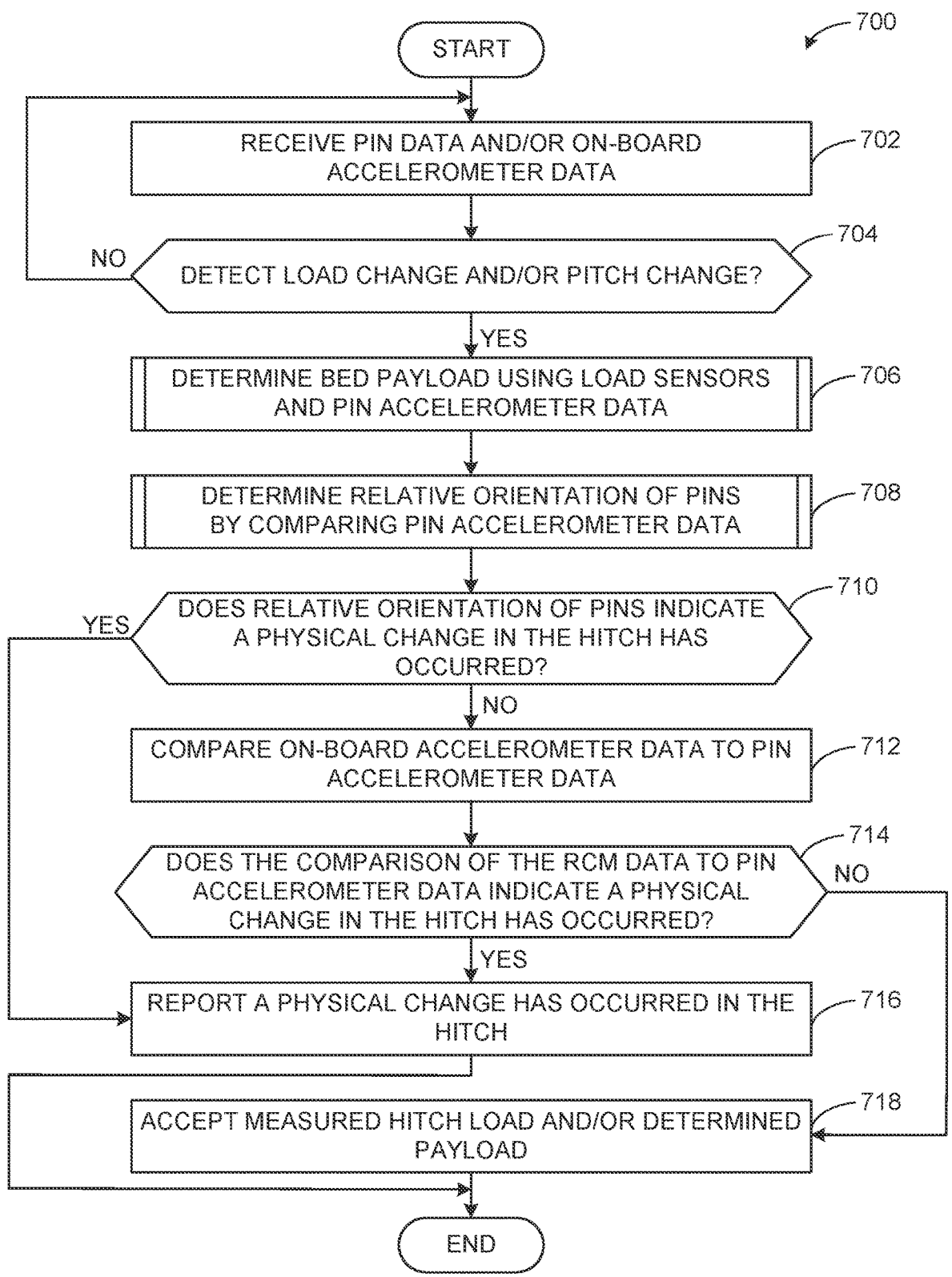
FIGS. 7-9 are flowcharts representative of machine readable instructions that may be executed to implement the load manager of FIGS. 1 and/or 3.
Figure 8:
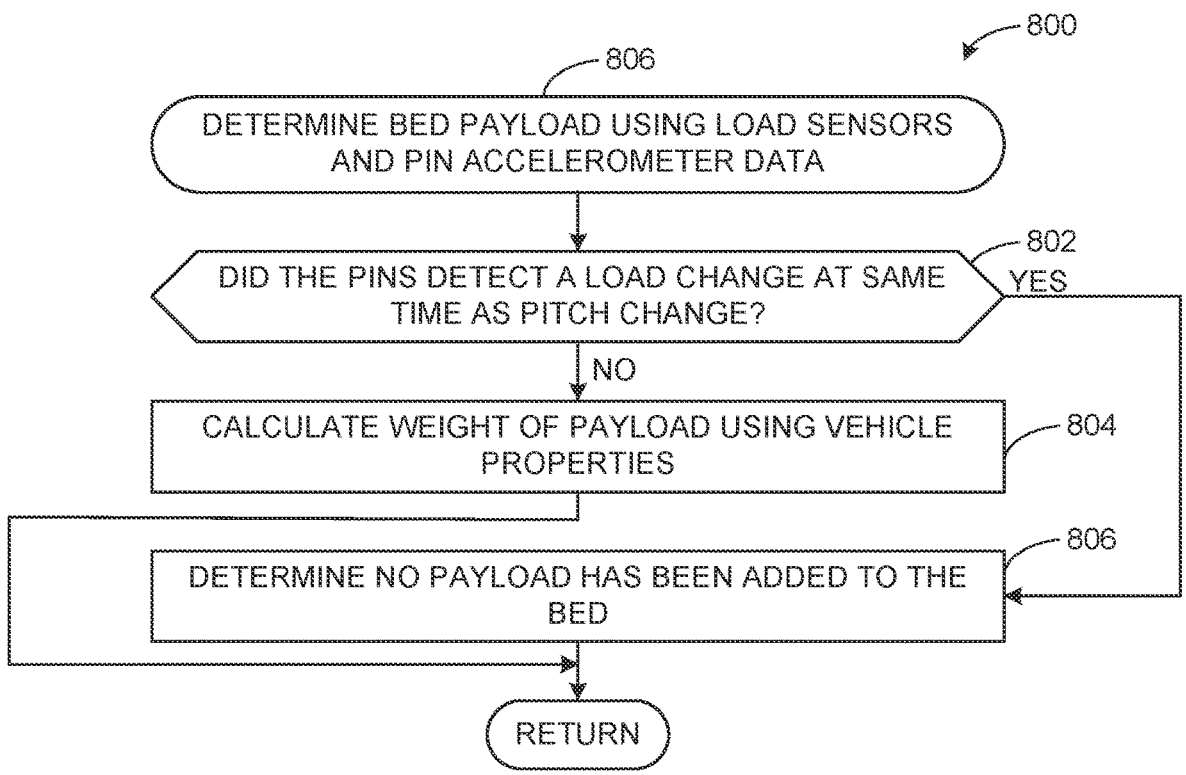
Figure 9:
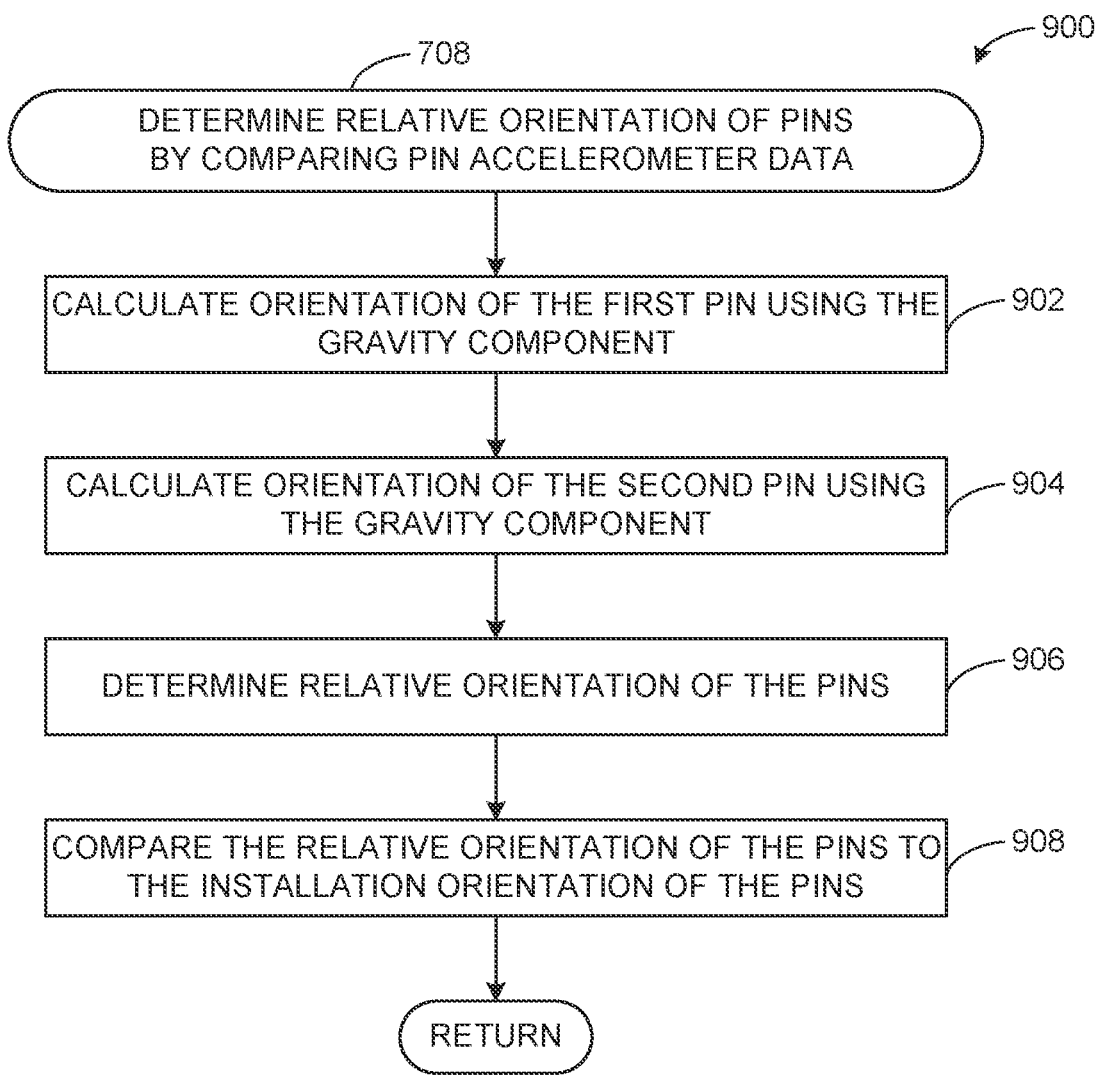

Flowcharts representative of example methods, hardware implemented state machines, and/or any combination thereof for implementing the load manager 112 of FIGS. 1 and/or 3 are shown in FIGS. 7-9. The methods may be one or more executable programs or portion(s) of an executable program for execution by a computer processor such as the processor 1012 shown in the example processor platform 1000 discussed below in connection with FIG. 10. The program may be embodied in software stored on a non-transitory computer readable storage medium such as a CD-ROM, a floppy disk, a hard drive, a DVD, a Blu-ray disk, or a memory associated with the processor 1012, but the entire program and/or parts thereof could alternatively be executed by a device other than the processor 1012 and/or embodied in firmware or dedicated hardware. Further, although the example program is described with reference to the flowcharts illustrated in FIG. 7-8, many other methods of implementing the example load manager 112 may alternatively be used. For example, the order of execution of the blocks may be changed, and/or some of the blocks described may be changed, eliminated, or combined. Additionally or alternatively, any or all of the blocks may be implemented by one or more hardware circuits (e.g., discrete and/or integrated analog and/or digital circuitry, an FPGA, an ASIC, a comparator, an operational-amplifier (op-amp), a logic circuit, etc.) structured to perform the corresponding operation without executing software or firmware.

The machine readable instructions described herein may be stored in one or more of a compressed format, an encrypted format, a fragmented format, a packaged format, etc. Machine readable instructions as described herein may be stored as data (e.g., portions of instructions, code, representations of code, etc.) that may be utilized to create, manufacture, and/or produce machine executable instructions. For example, the machine readable instructions may be fragmented and stored on one or more storage devices and/or computing devices (e.g., servers). The machine readable instructions may require one or more of installation, modification, adaptation, updating, combining, supplementing, configuring, decryption, decompression, unpacking, distribution, reassignment, etc. in order to make them directly readable and/or executable by a computing device and/or other machine. For example, the machine readable instructions may be stored in multiple parts, which are individually compressed, encrypted, and stored on separate computing devices, wherein the parts when decrypted, decompressed, and combined form a set of executable instructions that implement a program such as that described herein. In another example, the machine readable instructions may be stored in a state in which they may be read by a computer, but require addition of a library (e.g., a dynamic link library (DLL)), a software development kit (SDK), an application programming interface (API), etc. in order to execute the instructions on a particular computing device or other device. In another example, the machine readable instructions may need to be configured (e.g., settings stored, data input, network addresses recorded, etc.) before the machine readable instructions and/or the corresponding program(s) can be executed in whole or in part. Thus, the disclosed machine readable instructions and/or corresponding program(s) are intended to encompass such machine readable instructions and/or program(s) regardless of the particular format or state of the machine readable instructions and/or program(s) when stored or otherwise at rest or in transit.

As mentioned above, the example methods 700, 800, 900 of FIGS. 7-9 may be implemented using executable instructions (e.g., computer and/or machine readable instructions) stored on a non-transitory computer and/or machine readable medium such as a hard disk drive, a flash memory, a read-only memory, a compact disk, a digital versatile disk, a cache, a random-access memory and/or any other storage device or storage disk in which information is stored for any duration (e.g., for extended time periods, permanently, for brief instances, for temporarily buffering, and/or for caching of the information). As used herein, the term non-transitory computer readable medium is expressly defined to include any type of computer readable storage device and/or storage disk and to exclude propagating signals and to exclude transmission media.

"Including" and "comprising" (and all forms and tenses thereof) are used herein to be open ended terms. Thus, whenever a claim employs any form of "include" or "comprise" (e.g., comprises, includes, comprising, including, having, etc.) as a preamble or within a claim recitation of any kind, it is to be understood that additional elements, terms, etc. may be present without falling outside the scope of the corresponding claim or recitation. As used herein, when the phrase "at least" is used as the transition term in, for example, a preamble of a claim, it is open-ended in the same manner as the term "comprising" and "including" are open ended. The term "and/or" when used, for example, in a form such as A, B, and/or C refers to any combination or subset of A, B, C such as (1) A alone, (2) B alone, (3) C alone, (4) A with B, (5) A with C, (6) B with C, and (7) A with B and with C. As used herein in the context of describing structures, components, items, objects and/or things, the phrase "at least one of A and B" is intended to refer to implementations including any of (1) at least one A, (2) at least one B, and (3) at least one A and at least one B. Similarly, as used herein in the context of describing structures, components, items, objects and/or things, the phrase "at least one of A or B" is intended to refer to implementations including any of (1) at least one A, (2) at least one B, and (3) at least one A and at least one B. As used herein in the context of describing the performance or execution of processes, instructions, actions, activities and/or steps, the phrase "at least one of A and B" is intended to refer to implementations including any of (1) at least one A, (2) at least one B, and (3) at least one A and at least one B. Similarly, as used herein in the context of describing the performance or execution of processes, instructions, actions, activities and/or steps, the phrase "at least one of A or B" is intended to refer to implementations including any of (1) at least one A, (2) at least one B, and (3) at least one A and at least one B.

The method 700 of FIG. 7 begins at block 702. At block 702, the sensor interface 402 receives pin data and/or on-board accelerometer data. For example, the sensor interface 402 can receive data from a magnetoelastic force sensor and/or accelerometers (e.g., the accelerometers 607, 609 of FIGS. 6A-6C) incorporated in the sensor pins 206, 208. In some examples, the sensor interface 402 can received data from the RCM 110 and/or any accelerometer(s) associated with the vehicle 102. In some examples, the sensor interface 402 can receive data from the first sensor pin 206 and/or the second sensor pin 208 in an analog format (e.g., a voltage, etc.). In this example, the sensor interface 402 converts the analog format into a digital value (e.g., a force, a pressure, etc.).

At block 704, the change detector 404 determines if a load change and/or pitch change has been detected. For example, the change detector 404 can analyze the received pin data to detect a load change and/or pitch change in the hitch 108. In some examples, the change detector 404 determines when the load change and/or the pitch change detected by the sensor pins 206, 208 occurred. If the change detector 404 detects a load change and/or pitch change, the method 700 advances to block 706. If the change detector 404 does not detect a load change and/or pitch change, the method 700 returns to block 702.

At block 706, the payload determiner 406 determines the weight of a payload loaded in the bed 114 of the vehicle 102. The execution of block 706 is described in further detail in conjunction with FIG. 8. At block 708, the pin orientation determiner 408 determines the relative orientation of the sensor pins 206, 208 by comparing pin accelerometer data. The execution of block 708 is described in further detail in conjunction with FIG. 9.

At block 710, the hitch condition detector 410 determines if the relative orientation of pins indicate a physical change in the hitch has occurred. For example, the hitch condition detector 410 can determine if the difference between the relative orientation of the sensor pins 206, 208 and installation orientation of the sensor pins 206, 208 satisfies a first fault threshold (e.g., zero degrees, five degrees, etc.). If the relative orientation of the pins indicates a physical change in the hitch 108 has occurred (e.g., the first fault threshold is satisfied, etc.), the method 700 advances to block 716. If the relative orientation of the pins does not indicate a physical change in the hitch 108 has occurred (e.g., the first fault threshold is not satisfied, etc.), the method 700 advances to block 712.

At block 712, the pin orientation determiner 408 compares on-board accelerometer data to pin accelerometer data. For example, the pin orientation determiner 408 can determine the difference between a vehicle orientation based on the on-board accelerometer data to a pin orientation (e.g., the orientation determined based on the pitch data, etc.) Additionally or alternatively, the pin orientation determiner 408 can compare the relative orientation to a vehicle orientation based on the on-board accelerometer data.

At block 714, the hitch condition detector 410 determines if the comparison of the on-board accelerometer data to pin accelerometer data indicates a physical change in the hitch 108 has occurred. For example, the pin orientation determiner 408 can determine the difference between relative orientation of the pins and the data received from the RCM of the vehicle 102 to determine if the difference satisfies a second fault threshold (e.g., zero degrees, five degrees, etc.). If the comparison of the on-board accelerometer data to pin accelerometer data indicates a physical fault in the hitch 108 has occurred (e.g., the second fault threshold is satisfied, etc.), the method 700 advances to block 716. If the comparison of the on-board accelerometer data to pin accelerometer data does not indicate a physical fault in the hitch 108 has occurred (e.g., the second fault threshold is not satisfied, etc.), the method 700 advances to block 718.

At block 716, the vehicle interface 412 reports the physical change has occurred in the hitch 108. For example, the vehicle interface 412 can report a physical change to an ECU associate with the vehicle 102. In some examples, the vehicle interface 412 can alert a user of the vehicle 102 to indicate a physical change has occurred in the vehicle (e.g., via a display, via dashboard light, via a sound alert, via an alert on the instrument cluster, via an alert on the center console, via a mobile device associated with the user, etc.). After the execution of block 716, the method 700 ends.

At block 718, the vehicle interface 412 accepts the measured hitch load(s) and/or payload. For example, the vehicle interface 412 can transmit the measured hitch load(s) (e.g., the tongue load, the towed load, the lateral load, etc.) and/or payload to an ECU associated with the vehicle 102. In some examples, the vehicle interface 412 can cause the measured hitch load and/or payload to be presented to a user of the vehicle 102. After the execution of block 718, the method 700 ends.

The method 800 of FIG. 8 begins at block 802. At block 802, the payload determiner 406 determines if the pins detected a load change at the same time as a pitch change. For example, the payload determiner 406 can compare when a load change was detected by the change detector 404 to when a pitch change was detected by the change detector 404 to determine if the time difference between the load change and the pitch change satisfies a threshold (e.g., zero seconds, 2 seconds, etc.). In other examples, the payload determiner 406 can determine that a pitch change and/or a load change has not occurred. If the payload determiner 406 detected a load change at the same time as the pitch change (e.g., the difference does satisfy the threshold, etc.) the method 800 advances to block 806. If the payload determiner 406 did not detect a hitch load change at the same time as the load change (e.g., no load change was detected, the difference does not satisfy a threshold, etc.), the method 800 advances to block 804.

At block 804, the payload determiner 406 calculates weight of a payload using vehicle properties. For example, the payload determiner 406 can determine the weight of the payload 104 based on a vehicle configuration and/or a suspension property. In other examples, the payload determiner 406 can determine the weight of the payload by any other suitable means. After the execution of block 804, the method 800 ends.

At block 806, the payload determiner 406 determines no payload has been added to the bed. For example, the payload determiner 406 can determine that the detected pitch change was caused by the coupling of the trailer 106 to the hitch 108.

The method 900 of FIG. 9 begins at block 902. At block 902, the pin orientation determiner 408 calculates the orientation (e.g., the first accelerometer orientation 608, etc.) of the first sensor pin 206 using gravity vector 614. For example, the pin orientation determiner 408 can use Equation (1) to calculate the orientation of the first sensor pin 206 using the gravity vector 614. In some examples, the pin orientation determiner 408 can determine the orientation of the first sensor pin 206 using an acceleration value measured by the first sensor pin 206. In other examples, the pin orientation determiner 408 can determine the orientation of the first sensor pin 206 by any other suitable means.

At block 904, the pin orientation determiner 408 calculates the orientation of the second sensor pin 208 (e.g., the second accelerometer orientation 610, etc.) using the gravity vector 614. For example, the pin orientation determiner can use Equation (2) to calculate the orientation of the second sensor pin 208 using the gravity vector 614. In some examples, the pin orientation determiner 408 can determine the orientation of the second sensor pin 208 using an acceleration value measured by the second sensor pin 208. In other examples, the pin orientation determiner 408 can determine the orientation of the second sensor pin 208 by any other suitable means.

At block 906, the pin orientation determiner 408 determines the relative orientation of the sensor pins 206, 208. For example, the pin orientation determiner 408 can determine the relative orientation of the sensor pins 206, 208 by comparing the orientation of the sensor pins 206, 208. In other examples, the pin orientation determiner 408 can determine the relative orientation of the sensor pins 206, 208 using any other suitable means.

At block 908, the pin orientation determiner 408 compares the relative orientation of the pins to the installation orientation of the sensor pins 206, 208. For example, the pin orientation determiner 408 can compare the relative orientation of the sensor pins 206, 208 to the installation orientation of the sensor pins 206, 208. In some examples, the pin orientation determiner 408 further bases the comparison of the relative orientation of the sensor pins 206, 208 and the installation orientation of the sensor pins 206, 208 on a measurement of on-board accelerometer (e.g., from the RCM 110, etc.). In other examples, the pin orientation determiner 408 can compare the relative orientation by any other suitable means. After the execution of block 908, the method 900 ends.

Figure 10:
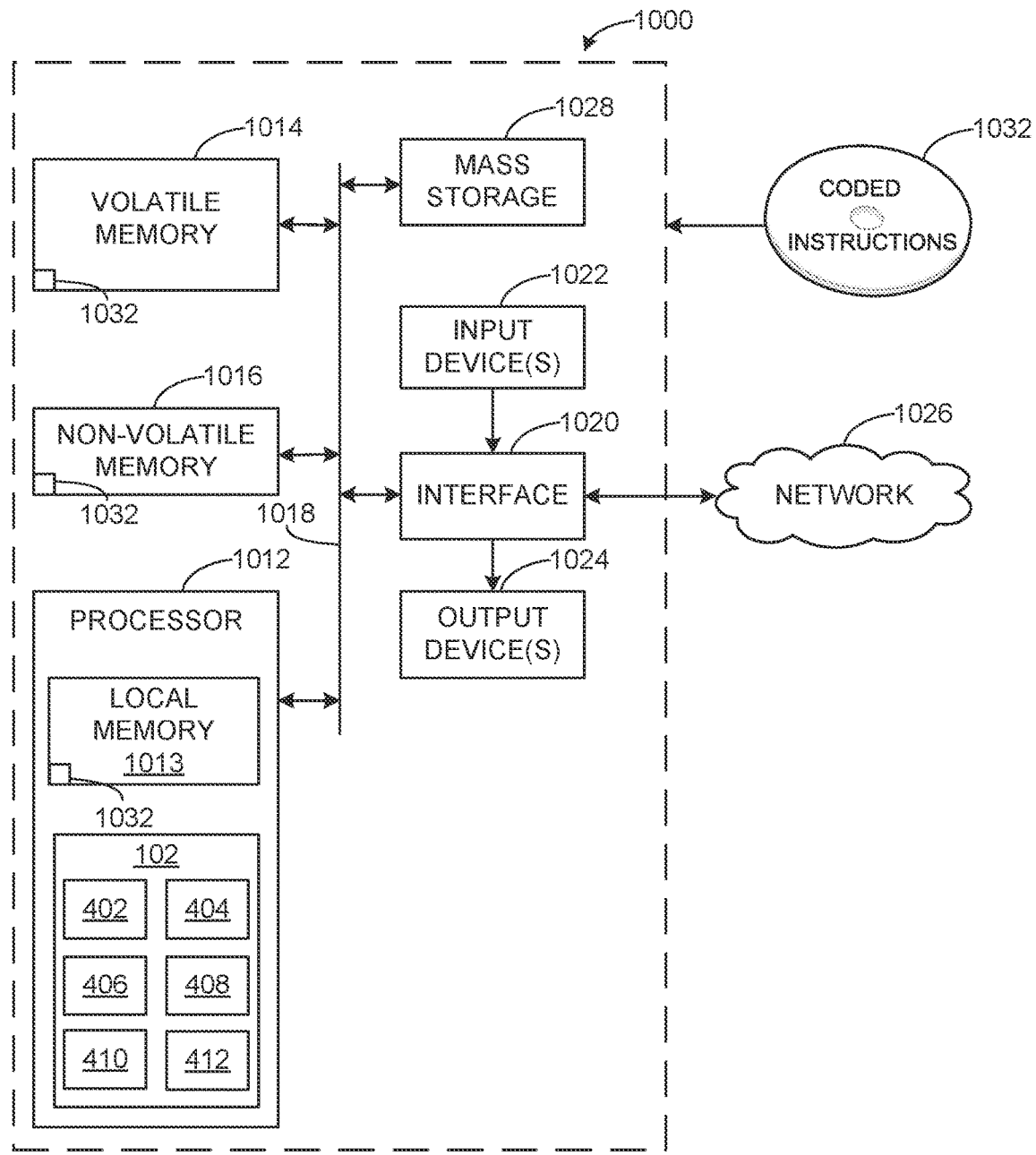
FIG. 10 is a block diagram of an example processing platform structured to execute the instructions of FIGS. 7-9 to implement the load manager of FIGS. 1 and/or 3.

FIG. 10 is a block diagram of an example processor platform 1000 structured to execute the instructions of FIGS. 7-9 to implement the load manager 112 of FIGS. 1 and/or 3. The processor platform 1000 can be, for example, a server, a personal computer, a workstation, a self-learning machine (e.g., a neural network), a mobile device (e.g., a cell phone, a smart phone, a tablet such as an iPad™), a personal digital assistant (PDA), an Internet appliance, a DVD player, a CD player, a digital video recorder, a Blu-ray player, a gaming console, a personal video recorder, a set top box, a headset or other wearable device, or any other type of computing device.

The processor platform 1000 of the illustrated example includes a processor 1012. The processor 1012 of the illustrated example is hardware. For example, the processor 1012 can be implemented by one or more integrated circuits, logic circuits, microprocessors, GPUs, DSPs, or controllers from any desired family or manufacturer. The hardware processor may be a semiconductor based (e.g., silicon based) device. In this example, the processor implements the example sensor interface 402, the example change detector 404, the example payload determiner 406, the example pin orientation determiner 408, the example hitch condition detector 410, and the example vehicle interface 412.

The processor 1012 of the illustrated example includes a local memory 1013 (e.g., a cache). The processor 1012 of the illustrated example is in communication with a main memory including a volatile memory 1014 and a non-volatile memory 1016 via a bus 1018. The volatile memory 1014 may be implemented by Synchronous Dynamic Random Access Memory (SDRAM), Dynamic Random Access Memory (DRAM), RAMBUS® Dynamic Random Access Memory (RDRAM®) and/or any other type of random access memory device. The non-volatile memory 1016 may be implemented by flash memory and/or any other desired type of memory device. Access to the main memory 1014, 1016 is controlled by a memory controller.

The processor platform 1000 of the illustrated example also includes an interface circuit 1020. The interface circuit 1020 may be implemented by any type of interface standard, such as an Ethernet interface, a universal serial bus (USB), a Bluetooth® interface, a near field communication (NFC) interface, and/or a PCI express interface.

In the illustrated example, one or more input devices 1022 are connected to the interface circuit 1020. The input device(s) 1022 permit(s) a user to enter data and/or commands into the processor 1012. The input device(s) can be implemented by, for example, an audio sensor, a microphone, a camera (still or video), a keyboard, a button, a mouse, a touchscreen, a track-pad, a trackball, isopoint and/or a voice recognition system.

One or more output devices 1024 are also connected to the interface circuit 1020 of the illustrated example. The output devices 1024 can be implemented, for example, by display devices (e.g., a light emitting diode (LED), an organic light emitting diode (OLED), a liquid crystal display (LCD), a cathode ray tube display (CRT), an in-place switching (IPS) display, a touchscreen, etc.), a tactile output device, a printer and/or speaker. The interface circuit 1020 of the illustrated example, thus, typically includes a graphics driver card, a graphics driver chip and/or a graphics driver processor.

The interface circuit 1020 of the illustrated example also includes a communication device such as a transmitter, a receiver, a transceiver, a modem, a residential gateway, a wireless access point, and/or a network interface to facilitate exchange of data with external machines (e.g., computing devices of any kind) via a network 1026. The communication can be via, for example, an Ethernet connection, a digital subscriber line (DSL) connection, a telephone line connection, a coaxial cable system, a satellite system, a line-of-site wireless system, a cellular telephone system, etc.

The processor platform 1000 of the illustrated example also includes one or more mass storage devices 1028 for storing software and/or data. Examples of such mass storage devices 1028 include floppy disk drives, hard drive disks, compact disk drives, Blu-ray disk drives, redundant array of independent disks (RAID) systems, and digital versatile disk (DVD) drives.

The machine executable instructions 1032 of FIGS. 7-9 may be stored in the mass storage device 1028, in the volatile memory 1014, in the non-volatile memory 1016, and/or on a removable non-transitory computer readable storage medium such as a CD or DVD.

Example 1 includes an apparatus, comprising a pin orientation determiner to determine a first orientation of a first pin and a second orientation of a second pin, the first pin and the second pin disposed within a hitch, and calculate a relative orientation of the first pin and the second pin based on the first orientation and the second orientation, and a hitch condition detector to determine if a physical change has occurred in the hitch by comparing the relative orientation to an installation orientation of the first pin and the second pin.

Example 2 includes the apparatus of example 1, wherein the hitch condition detector is further to determine if the physical change has occurred in the hitch by comparing the relative orientation to a vehicle orientation.

Example 3 includes the apparatus of example 2, wherein the vehicle orientation is calculated based an acceleration value generated by an accelerometer of a vehicle coupled to the hitch.

Example 4 includes the apparatus of example 1, further including a sensor interface to receive a first acceleration value and a second acceleration value from a first accelerometer associated with the first pin and a second accelerometer associated with the second pin, respectively, and the pin orientation determiner is further to calculate the first orientation based on the first acceleration value and a gravitational vector, and calculate the second orientation based on the second acceleration value and the gravitational vector.

Example 5 includes the apparatus of example 1, wherein the hitch includes a crossbar, and the first pin and the second pin are at substantially the same vertical position relative to the crossbar.

Example 6 includes the apparatus of example 1, further including a change detector to detect, via the first pin and the second pin, a hitch load associated with a trailer coupled to the hitch, and a hitch condition detector to accept the hitch load in response to determining the physical change has not occurred.

Example 7 includes the apparatus of example 1, wherein the pin orientation determiner determines if the physical change has occurred in the hitch by comparing the relative orientation to an installation orientation of the first pin and the second pin by determining that the physical change has occurred when a difference between the relative orientation and the installation orientation satisfies a threshold.

Example 8 includes a method, comprising determining a first orientation of a first pin and a second orientation of a second pin, the first pin and the second pin disposed within a hitch, calculating a relative orientation of the first pin and the second pin based on the first orientation and the second orientation, and determining if a physical change has occurred in the hitch by comparing the relative orientation to an installation orientation of the first pin and the second pin.

Example 9 includes the method of example 8, further including determining if the physical change has occurred in the hitch by comparing the relative orientation to a vehicle orientation.

Example 10 includes the method of example 9, wherein the vehicle orientation is calculated based an acceleration value generated by an accelerometer of a vehicle coupled to the hitch.

Example 11 includes the method of example 8, wherein the determining the first orientation of the first pin and the second orientation of a second pin includes receiving a first acceleration value and a second acceleration value from a first accelerometer associated with the first pin and a second accelerometer associated with the second pin, respectively, calculating the first orientation based on the first acceleration value and a gravitational vector, and calculating the second orientation based on the second acceleration value and the gravitational vector.

Example 12 includes the method of example 8, wherein the hitch includes a crossbar, and the first pin and the second pin are at substantially the same vertical position relative to the crossbar.

Example 13 includes the method of example 8, further including detecting, via the first pin and the second pin, a hitch load associated with a trailer coupled to the hitch and accepting the hitch load in response to determining the physical change has not occurred.

Example 14 includes the method of example 8, wherein the determining if the physical change has occurred in the hitch by comparing the relative orientation to an installation orientation of the first pin and the second pin includes determining that the physical change has occurred when a difference between the relative orientation and the installation orientation satisfies a threshold.

Example 15 includes a non-transitory machine-readable storage medium including instructions which, when executed, cause a processor to at least determine a first orientation of a first pin and a second orientation of a second pin, the first pin and the second pin disposed within a hitch, calculate a relative orientation of the first pin and the second pin based on the first orientation and the second orientation, and determine if a physical change has occurred in the hitch by comparing the relative orientation to an installation orientation of the first pin and the second pin.

Example 16 includes the non-transitory machine-readable storage medium of example 15, wherein the instructions, when executed, further cause the processor to determine if the physical change has occurred in the hitch by comparing the relative orientation to a vehicle orientation.

Example 17 includes the non-transitory machine-readable storage medium of example 16, wherein the vehicle orientation is calculated based an acceleration value generated by an accelerometer of a vehicle coupled to the hitch.

Example 18 includes the non-transitory machine-readable storage medium of example 15, wherein the instructions, when executed, further cause the processor to receive a first acceleration value and a second acceleration value from a first accelerometer associated with the first pin and a second accelerometer associated with the second pin, respectively, calculate the first orientation based on the first acceleration value and a gravitational vector, and calculate the second orientation based on the second acceleration value and the gravitational vector.

Example 19 includes the non-transitory machine-readable storage medium of example 15, wherein the instructions, when executed, further cause the processor to detect, via the first pin and the second pin, a hitch load associated with a trailer coupled to the hitch, and accept the hitch load in response to determining the physical change has not occurred.

Example 20 includes the non-transitory machine-readable storage medium of example 15, wherein the determining if the physical change has occurred in the hitch by comparing the relative orientation to an installation orientation of the first pin and the second pin includes determining that the physical change has occurred when a difference between the relative orientation and the installation orientation satisfies a threshold.

Example 21 includes an apparatus, comprising a hitch change detector to detect, via an accelerometer of a hitch, a pitch angle change of a vehicle, and a payload determiner to determine if a hitch load change occurred within a threshold time after the pitch angle change, and in response to determining the hitch load change occurred within the threshold time, calculate a weight associated with a payload within a bed of the vehicle based on a property of the vehicle.

Example 22 includes the apparatus of example 21, wherein the payload determiner is further to, in response to determining the hitch load change did not occur within the threshold time, determine no payload has been disposed within the bed of the vehicle.

Example 23 includes the apparatus of example 21, wherein the property of the vehicle includes at least one of a vehicle configuration or a suspension property.

Example 24 includes the apparatus of example 21, wherein the accelerometer is within a pin of the hitch.

Example 25 includes the apparatus of example 21, wherein the hitch load change is associated with a coupling of a trailer to the vehicle via the hitch.

Example 26 includes the apparatus of example 25, wherein the pitch angle change is associated with at least one of the coupling of the trailer to the vehicle or an addition of the payload to the vehicle.

Example 27 includes the apparatus of example 21, wherein the payload determiner calculates the weight associated with the payload disposed within the bed of the vehicle without input from a sensor associated with a suspension system of the vehicle.

Example 28 includes a method, comprising detecting, via an accelerometer of a hitch, a pitch angle change of a vehicle, determining if a hitch load change occurred within a threshold time after the pitch angle change, and in response to determining the hitch load change occurred within the threshold time, calculating a weight associated with a payload within a bed of the vehicle based on a property of the vehicle.

Example 29 includes the method of example 28, further including in response to determining the hitch load change did not occur within the threshold time, determining no payload has been disposed within the bed of the vehicle.

Example 30 includes the method of example 28, wherein the property of the vehicle includes at least one of a vehicle configuration or a suspension property.

Example 31 includes the method of example 28, wherein the accelerometer is within a pin of the hitch.

Example 32 includes the method of example 28, wherein the hitch load change is associated with a coupling of a trailer to the vehicle via the hitch.

Example 33 includes the method of example 32, wherein the pitch angle change is associated with at least one of the coupling of the trailer to the vehicle or an addition of the payload to the vehicle.

Example 34 includes the method of example 28, wherein the calculating the weight associated with the payload disposed within the bed of the vehicle is performed without input from a sensor associated with a suspension system of the vehicle.

Example 35 includes a non-transitory machine-readable storage medium including instructions which, when executed, cause a processor to at least detect, via an accelerometer of a hitch, a pitch angle change of a vehicle, determine if a hitch load change occurred within a threshold time after the pitch angle change, and in response to determining the hitch load change occurred within the threshold time, calculate a weight associated with a payload within a bed of the vehicle based on a property of the vehicle.

Example 36 includes the non-transitory machine-readable storage medium of example 35, wherein the instructions further cause the processor to, in response to determining the hitch load change did not occur within the threshold time, determine no payload has been disposed within the bed of the vehicle.

Example 37 includes the non-transitory machine-readable storage medium of example 35, wherein the property of the vehicle includes at least one of a vehicle configuration or a suspension property.

Example 38 includes the non-transitory machine-readable storage medium of example 35, wherein the hitch load change is associated with a coupling of a trailer to the vehicle via the hitch.

Example 39 includes the non-transitory machine-readable storage medium of example 38, wherein the pitch angle change is associated with at least one of the coupling of the trailer to the vehicle or an addition of the payload to the vehicle.

Example 40 includes the non-transitory machine-readable storage medium of example 35, wherein the processor calculates the weight associated with the payload disposed within the bed of the vehicle is performed without input from a sensor associated with a suspension system of the vehicle.

Although certain example methods, apparatus and articles of manufacture have been disclosed herein, the scope of coverage of this patent is not limited thereto. On the contrary, this patent covers all methods, apparatus and articles of manufacture fairly falling within the scope of the claims of this patent.

What is claimed is:

1. An apparatus, comprising:
    an accelerometer coupled to a hitch;
    change detector circuitry to detect a pitch angle change of a vehicle based on an output of the accelerometer;
    at least two force sensing pins on the hitch to detect hitch loads; and
    a payload determiner circuitry configured to:
        determine a time difference between a hitch load change measured by the at least two force sensing pins and the pitch angle change measured by the accelerometer; and
        in response to determining the time difference satisfies a threshold time, calculate a weight associated with a payload within a bed of the vehicle based on at least a squat of the vehicle measured by at least one of the accelerometer or the at least two force sensing pins.

2. The apparatus of claim 1, wherein the payload determiner circuitry is further configured to, in response to determining the time difference does not satisfy the threshold time, determine no payload has been disposed within the bed of the vehicle.

3. The apparatus of claim 1, wherein the payload determiner circuitry calculates the squat of the vehicle based on a measurement of a deflection of a portion of the vehicle.

4. The apparatus of claim 1, wherein the at least two force sensing pins include the accelerometer.

5. The apparatus of claim 1, wherein the hitch load change is associated with a coupling of a trailer to the vehicle via the hitch.

6. The apparatus of claim 5, wherein the pitch angle change is associated with at least one of the coupling of the trailer to the vehicle or an addition of the payload to the vehicle.

7. The apparatus of claim 1, wherein the payload determiner circuitry calculates the weight associated with the payload disposed within the bed of the vehicle without input from the at least two force sensing pins associated with measuring a deflection of a suspension system of the vehicle.

8. A method, comprising:
    detecting a pitch angle change of a vehicle based on an output of an accelerometer of a hitch;
    determining a time difference between a hitch load change and the pitch angle change, the hitch load change detected by at least two force sensing pins on the hitch, the pitch angle change measured by the accelerometer; and
    in response to determining that the time difference satisfies a threshold time, calculating a weight associated with a payload within a bed of the vehicle based on at least a squat of the vehicle measured by at least one of the accelerometer or the at least two force sensing pins.

9. The method of claim 8, further including in response to determining the time difference does not satisfy the threshold time, determining no payload has been disposed within the bed of the vehicle.

10. The method of claim 8, wherein calculating the weight of the vehicle includes calculating the squat based on a measurement of a deflection of a portion of the vehicle.

11. The method of claim 8, wherein the at least two force sensing pins include the accelerometer.

12. The method of claim 8, wherein the hitch load change is associated with a coupling of a trailer to the vehicle via the hitch.

13. The method of claim 12, wherein the pitch angle change is associated with at least one of the coupling of the trailer to the vehicle or an addition of the payload to the vehicle.

14. The method of claim 8, wherein the calculating the weight associated with the payload disposed within the bed of the vehicle is performed without input from the at least two force sensing pins associated with measuring a deflection of a suspension system of the vehicle.

15. A non-transitory machine-readable storage medium including instructions which, when executed, cause a processor to at least:
    detect a pitch angle change of a vehicle based on an output of an accelerometer of a hitch;
    determine a time difference between a hitch load change and the pitch angle change, the hitch load change detected by at least two force sensing pins on the hitch, the pitch angle change measured by the accelerometer; and
    in response to determining that the time difference satisfies a threshold time, calculate a weight associated with a payload within a bed of the vehicle based on at least a squat of the vehicle measured by at least one of the accelerometer or the at least two force sensing pins.

16. The non-transitory machine-readable storage medium of claim 15, wherein the instructions further cause the processor to, in response to determining the time difference does not satisfy the threshold time, determine no payload has been disposed within the bed of the vehicle.

17. The non-transitory machine-readable storage medium of claim 15, wherein the instructions further cause the processor to calculate the squat based on a measurement of a deflection of a portion of the vehicle.

18. The non-transitory machine-readable storage medium of claim 15, wherein the hitch load change is associated with a coupling of a trailer to the vehicle via the hitch.

19. The non-transitory machine-readable storage medium of claim 18, wherein the pitch angle change is associated with at least one of the coupling of the trailer to the vehicle or an addition of the payload to the vehicle.

20. The non-transitory machine-readable storage medium of claim 15, wherein the processor calculates the weight associated with the payload disposed within the bed of the vehicle without input from the at least two force sensing pins associated with measuring a deflection of a suspension system of the vehicle.

* * * * *